US009002386B2

(12) United States Patent
Ngo

(10) Patent No.: US 9,002,386 B2
(45) Date of Patent: Apr. 7, 2015

(54) INTERACTIVE SYSTEM AND PROCESS

(75) Inventor: Duc Anh Ngo, Maribyrnong (AU)

(73) Assignee: Fruitful Technologies Pty Ltd. (AU)

( * ) Notice: Subject to any disclaimer, the term of this patent is extended or adjusted under 35 U.S.C. 154(b) by 573 days.

(21) Appl. No.: 12/445,452

(22) PCT Filed: Oct. 19, 2007

(86) PCT No.: PCT/AU2007/001599
§ 371 (c)(1),
(2), (4) Date: Jan. 14, 2010

(87) PCT Pub. No.: WO2008/046161
PCT Pub. Date: Apr. 24, 2008

(65) Prior Publication Data
US 2010/0197326 A1  Aug. 5, 2010

(30) Foreign Application Priority Data

Oct. 19, 2006 (AU) .................. 2006905829

(51) Int. Cl.
*H04W 4/12* (2009.01)
*H04M 3/42* (2006.01)
*G06F 9/445* (2006.01)
*H04W 8/24* (2009.01)
*H04M 1/725* (2006.01)
*H04W 4/18* (2009.01)
*H04W 12/04* (2009.01)

(52) U.S. Cl.
CPC ............. *H04M 3/42178* (2013.01); *G06F 8/65* (2013.01); *H04W 8/245* (2013.01); *H04M 1/72525* (2013.01); *H04M 2203/052* (2013.01); *H04M 2203/053* (2013.01); *H04W 4/18* (2013.01); *H04W 12/04* (2013.01)

(58) Field of Classification Search
None
See application file for complete search history.

(56) References Cited

U.S. PATENT DOCUMENTS

| 6,078,820 | A | * | 6/2000 | Wells et al. .................. 455/466 |
| 6,108,530 | A | * | 8/2000 | Ayabe et al. .................. 455/403 |
| 6,345,279 | B1 | * | 2/2002 | Li et al. ............................ 1/1 |
| 6,430,624 | B1 | * | 8/2002 | Jamtgaard et al. ............ 709/246 |
| 6,880,079 | B2 | * | 4/2005 | Kefford et al. ................ 713/155 |
| 7,188,183 | B1 | * | 3/2007 | Paul et al. ..................... 709/229 |
| 7,334,043 | B2 | * | 2/2008 | Daigle et al. .................. 709/231 |
| 7,680,683 | B2 | * | 3/2010 | Hilerio et al. ................ 705/7.27 |
| 7,707,120 | B2 | * | 4/2010 | Dominguez et al. ........... 705/78 |
| 7,813,720 | B2 | * | 10/2010 | Doffman .................... 455/414.1 |
| 7,853,782 | B1 | * | 12/2010 | Geddes ........................ 713/151 |

(Continued)

FOREIGN PATENT DOCUMENTS

EP  1 509 049 A1  2/2005
WO  0172001  9/2001

OTHER PUBLICATIONS

European Search Report dated Feb. 1, 2012 and issued in connection with corresponding European Patent Application No. 07815404.4.

*Primary Examiner* — Kent Chang
*Assistant Examiner* — Benjamin Morales Fernande
(74) *Attorney, Agent, or Firm* — Stamoulis & Weinblatt, LLC

(57) ABSTRACT

A method of delivering an instruction (206) to a mobile user device (106) connected to a network (110) is disclosed. The method comprising the steps of receiving an interactive workflow (202), translating the interactive workflow into the instruction (206) in a form executable by the mobile user device (106), and sending a message (208) including the instruction (206) to the mobile user device (106).

29 Claims, 31 Drawing Sheets

(56) References Cited

U.S. PATENT DOCUMENTS

| | | |
|---|---|---|
| 8,069,439 B2 * | 11/2011 | Shukla et al. ............... 717/125 |
| 2002/0023213 A1 * | 2/2002 | Walker et al. ............... 713/168 |
| 2002/0073023 A1 | 6/2002 | Castro et al. |
| 2003/0004771 A1 * | 1/2003 | Yaung ........................... 705/8 |
| 2004/0064696 A1 * | 4/2004 | Daigle et al. ............... 713/168 |
| 2004/0186889 A1 * | 9/2004 | Washburn ................... 709/206 |
| 2004/0205618 A1 * | 10/2004 | Sini et al. ................... 715/523 |
| 2005/0027808 A1 * | 2/2005 | Piiroinen et al. ........... 709/206 |
| 2005/0215271 A1 * | 9/2005 | Sim et al. .................... 455/466 |
| 2005/0266835 A1 * | 12/2005 | Agrawal et al. ............. 455/414.3 |
| 2006/0077941 A1 * | 4/2006 | Alagappan et al. .......... 370/338 |
| 2006/0095291 A1 * | 5/2006 | Cherney ......................... 705/1 |
| 2006/0206890 A1 * | 9/2006 | Shenfield et al. ........... 717/174 |
| 2007/0168228 A1 * | 7/2007 | Lawless ......................... 705/2 |
| 2007/0191032 A1 * | 8/2007 | Doffman ..................... 455/466 |
| 2007/0198968 A1 * | 8/2007 | Shenfield et al. ........... 717/104 |
| 2007/0261018 A1 * | 11/2007 | Sanghvi et al. .............. 717/100 |
| 2007/0287463 A1 * | 12/2007 | Wilson ......................... 455/445 |
| 2008/0085728 A1 * | 4/2008 | Reding et al. ................ 455/466 |
| 2009/0305633 A1 * | 12/2009 | Warsta ......................... 455/41.2 |

\* cited by examiner

Workflow Instruction data structure

| | Type | Data |
|---|---|---|
| Menu Single/Multiple Select | S,M | [PARAMETER] [TITLE] [ITEM1] [ITEM2]......[ITEMn] |
| Information Message | I | [TITLE] [MESSAGE] |
| Header Response | H | [HEADER] |
| Redirect Address | R | [PHONE NUMBER] |
| User Input | T | [PARAMETER] [LABEL] [TYPE] |
| Execute URL | E | [URL] |
| Jump to index | J | [CMD Index] |
| Go to previous Cmd | P | |
| Branch menu | B | [PARAMETER] [TITLE] [Label1,index1] [Label2,index2] ......[ITEMn] |
| No-op | N | |
| Store Permanent | K | [Title] |
| Clear Permanent Storage | D | |
| Read System Property | p | [Property name] |
| Configuration Settings | C | [Configurations] |

Type enumeration:
TYPE_ANY = 0;
TYPE_EMAILADDR=1;
TYPE_NUMERIC = 2;
TYPE_PHONENUMBER = 3;
TYPE_URL = 4;
TYPE_DECIMAL = 5;

FIGURE 16

| 0 | Instruction 1 response |
|---|---|
| 1 | Instruction 2 response |
| n | Instruction n response | script: Compile

```
HEADER "jmango "
DIVERT "+61418668968"
MESSAGE "Timesheet" "Please enter your timesheet
for this week"
BRANCH_TO "tsk" "Select task"
ITEM "Admin work" TIME
ITEM "Client meeting" TIME
ITEM "Work onsite" INPUT
ITEM "Sick leave" TIME
ITEM "Anual leave" TIME
GOTO END

# TIME
SELECT "tm" "Enter your time"
ITEM "1"
ITEM "2"
ITEM "3"
ITEM "4"
ITEM "5"
ITEM "6"
ITEM "7"
ITEM "8"
BRANCH_BACK

# INPUT
INPUT "tm" "Enter your time" DECIMAL
BRANCH_BACK

# END
NOP
```

FIGURE 30

```
private string SendWorkflowRequest(string sourceNumber,
    string destinationNumber, string bookingHeader,
    string bookingTitle, string bookingDetails)
{
    J2MECommand workflowCommand = new J2MECommand();      // 3102
    if (bookingHeader != null)                             // 3104
    {
        workflowCommand.AddCmdHeader(bookingHeader);
    }
    // Add information message
    workflowCommand.AddInfoMessage(bookingTitle, bookingDetails);   // 3106
    // Add selection menu
    workflowCommand.AddSingleMenu("action", "Select", new String[]{"Accept", "Reject"});   // 3108
    // Add input text box to enter name
    workflowCommand.AddUserInputCmd("name", "Enter your name", J2MECommand.InputType.ANY);   // 3110
    // Add input text box to enter contact number
    workflowCommand.AddUserInputCmd("contact", "Contact number", J2MECommand.InputType.PHONENUMBER);   // 3112
    // Add redirection address where the response message is sent to
    workflowCommand.AddRedirectHeader("sms://1991616");    // 3114

// Now send the command, in multiple messages if it is needed
    IList messages = workflowCommand.BuildCommandMessages(1000);   // 3116
    string sentIds = "";
    foreach (BinaryMessage binMessage in messages)
    {                                                              // 3118
        sentIds += _messageSender.SendBinaryMessage(sourceNumber, destinationNumber,
                       binMessage.UserData, binMessage.DataHeader);
        sentIds += ",";
    }
    return sentIds;
}
```

FIGURE 31

INTERACTIVE SYSTEM AND PROCESS

FIELD OF THE INVENTION

The present invention relates generally to a method of delivering an instruction to a mobile user device connected to a network.

BACKGROUND

Amongst the wide variety of portable electronic devices available today, mobile phones have become particularly pervasive, with more than double the penetration of the Internet. These devices have rapidly advanced in capability and can do far more than Voice and SMS. Using these capabilities to deliver and execute applications that provide customisable interactivity to mobile phones and other devices is highly desirable but continues to be a challenging endeavour due to the varied types of largely incompatible devices and platforms on the market.

Most interactive applications for mobile phones involve either Short Message Service (SMS) or the development of dedicated applications that address specific business requirements. SMS interactivity suffers from poor usability (the user has to be familiar with idiosyncratic commands) and security issues (SMS source addresses can be faked), thus limiting their usage to simple, non-sensitive transactions. Furthermore, an organisation wishing to use SMS to interact with its customers needs to come to some commercial arrangement with the telecommunications provider in order to establish billing procedures and so on. This can be inconvenient for the organisation, and may also be quite expensive, both to set up and also to operate on an on-going basis.

The dedicated applications are an attempt to address these shortcomings by developing programming code that is executed by the mobile device to perform a specific task. This involves significant amounts of time, at least because mobile phones from different manufacturers are not usually binary compatible and cannot execute the same executable applications. Additionally, these applications are limited to the functionality required at the time of development, and thus may not support additions or modifications to that functionality. As can be appreciated, distributing changes to these applications is similarly quite a tedious process, typically requiring the user to manually download and install an updated version of the application on their telephone.

SUMMARY OF THE INVENTION

According to one aspect of the invention there is provided a method of delivering an instruction to an application installed on a user device connected to a network, the method comprising the steps of:
  receiving an interactive workflow;
  translating the interactive workflow into the instruction in a form executable by the application; and
  sending a message including the instruction to the application at the user device.

According to another aspect of the invention there is provided a method of delivering an instruction to a mobile user device connected to a network, the method comprising the steps of
  receiving an interactive workflow;
  translating the interactive workflow into the instruction in a form executable by the mobile user device; and
  sending a message including the instruction to the mobile user device.

According to yet another aspect of the invention there is provided computer software comprising executable directions for delivering an instruction to a mobile user device connected to a network, the directions comprising the steps of:
  receiving an interactive workflow;
  translating the interactive workflow into the instruction in a form executable by the mobile user device; and
  sending a message including the instruction to the mobile user device.

Preferably the step of receiving the interactive workflow includes the step of receiving the interactive workflow coded in a high level programming or scripting language. More preferably the step of receiving the interactive workflow includes the step of receiving the interactive workflow from an external or third party.

Preferably the step of sending the message includes the step of sending a set of instructions for execution by an application installed on the mobile user device. More preferably the step of sending the set of instructions includes the step of sending the set of instructions for the device to interact with a user of the mobile user device.

Preferably the mobile user device is one of a plurality of mobile user devices and the method also comprises the step of receiving a specification of the mobile user device from a database comprising respective specifications for the plurality of user devices.

Preferably the step of translating the interactive workflow includes tailoring the instruction to the specification.

Preferably the step of translating the interactive workflow includes tailoring the instruction to a device operating system.

Preferably the step of sending the message includes the step of sending a unique message identifier. More preferably the step of sending the message includes one or more preliminary steps of compressing, encoding and encrypting the instruction.

Preferably the step of sending the message includes the step of sending the message via a Short Message Service (SMS) of a cellular network. More preferably the step of sending the message via SMS includes the step of splitting the message into a plurality of messages to comply with one or more standards of the SMS. Alternatively, the step of sending the message includes one or more of the steps of sending the message via a Cell Broadcast Service (CBS) of a cellular network, sending the message as an IP/TCP data packet over a GPRS or 3G network, and sending the message as a data packet over a Bluetooth connection.

Preferably the method further comprises the step of the mobile user device receiving the set of instructions and the unique message identifier. More preferably the step of the mobile user device receiving the set of instructions and the unique message identifier includes the step of receiving the set of instructions for translation to mobile user device system codes by a workflow execution engine component of the application.

Preferably the method further comprises the step of receiving a response to the instruction from the mobile user device. More preferably the step of receiving a response includes the step of receiving a response identifier from the device. Even more preferably the method comprises the step of comparing the unique message identifier and the response identifier to confirm the authenticity of the received message.

Preferably the method includes the step of checking if the mobile user device is willing to receive the instruction derived from the interactive workflow from the external or third party. More preferably the method includes the step of sending a request to the user of the mobile user device to accept the instruction derived from the interactive workflow from the external or third party.

Preferably the step of receiving the interactive workflow includes the preliminary step of receiving a request for an Application Programming Interface from the external or third party. More preferably the step of receiving a request for an Application Programming Interface is received from the external or third party. Even more preferably the step of receiving the interactive workflow includes the preliminary step of opening an Application Programming Interface.

Preferably the method also comprises the step of issuing a command to the device to update or delete a sequence of instructions saved to a permanent data store on the mobile user device.

In accordance with the present invention, there is also provided an interactive process executed by a computer system or device, the process including:
- receiving one or more SMS messages including instruction data representing one or more instructions for execution on said system or device to determine information;
- executing said one or more instructions to determine said information; and
- sending one or more SMS messages including response data representing said information.

Advantageously, said information may include system information determined from said system or device and/or user information determined from a user of said system or device.

Preferably, said execution causes generation of an interactive user interface on a display of said system or device, and the process includes receiving response data representing said information from a user of said system or device in response to said interactive display.

Preferably, said one or more instructions are executed by a virtual machine of said system or device.

The present invention also provides an application component for a system or device, the application component including:
- a message receiver for processing one or more received SMS messages to generate one or more instructions for execution on said device to determine information;
- an execution component for executing said one or more instructions of said application data to determine said information; and
- a message sender for generating one or more SMS messages including response data representing said information.

Preferably, the application component further includes a data management component for storing sets of instructions on non-volatile storage means and for retrieving a selected one of the stored sets of instructions for execution.

Preferably, said execution component is adapted to generate an interactive display for a user of said system or device, and to receive response data representing said information from a user of said system or device in response to said interactive display.

The present invention also provides an interactive process for execution by a system or device, including:
- receiving message data including header data and encrypted payload data;
- selecting one of a plurality of encryption keys on the basis of said header data; and
- decrypting said payload data using the selected encryption key.

Preferably, said header data includes index data representing an index for said plurality of encryption keys.

Advantageously, said payload data may represent one or more instructions for execution on said system or device to determine information.

Advantageously, said payload data may represent information in response to execution of one Or more instructions on a remote system or device.

The present invention also provides an interactive process for execution by a system or device, including:
- generating payload data for sending to a remote system or device;
- selecting one of a plurality of encryption keys;
- encrypting said payload data using the selected encryption key;
- generating message data for sending to said remote system or device, said message data including header data and the encrypted payload data, wherein said header data includes data representing an index for said plurality of encryption keys to allow said remote system or device to determine the selected encryption key and thereby to decrypt said payload data.

Advantageously, said payload data may represent one or more instructions for execution on said remote system or device to determine information.

Advantageously, said payload data may represent information in response to execution of one or more instructions.

Preferably, the process includes generating said plurality of encryption keys and sending said plurality of encryption keys to said remote system or device.

Preferably, the process includes associating said plurality of encryption keys with an identifier of said remote system or device.

The present invention also provides an interactive process, including:
- receiving programming instructions for generating an interactive display on a remote system or device;
- compiling said programming instructions to generate compiled instruction data;
- sending said compiled instruction data to said remote system or device to generate an interactive display on said second remote system or device;
- receiving response data representing at least one user response to said interactive display; and
- sending response data representing said at least one user response.

The present invention also provides an interactive process, including:
- receiving workflow instructions from a plurality of entities;
- processing said workflow instructions to generate interactive applications for execution on a plurality of user devices; and
- sending said interactive applications to said user devices for execution.

Preferably, said interactive applications are sent to said user devices using short message service (SMS).

Preferably, said user devices include mobile telephones.

The present invention also provides an interactive system for managing interaction with users of remote systems and/or devices, the interactive system being adapted to:
- receive workflow instructions from a plurality of entities;
- process said workflow instructions to generate interactive applications for execution on a plurality of user devices; and
- send said interactive applications to said user devices for execution.

The present invention also provides a system having components for executing any one of the above processes.

The present invention also provides a computer-readable storage medium having stored thereon program instructions for executing any one of the above processes.

The present invention also provides an interactive system, including:
- a gateway component for processing received workflow data to generate instructions for generating an interactive display on a user device, the gateway component being adapted to send said instructions to said user device for execution; and
- an execution component of said user device to receive and execute said instructions to generate said interactive display, to receive response data representing at least one response of said user to said interactive display; and to send said response data to said gateway component.

Preferably, said user device is a mobile telephone,

Advantageously, the instructions may be sent to said gateway component in one or more SMS messages.

Advantageously, said user response data may be sent to said user device in one or more SMS messages.

BRIEF DESCRIPTION OF THE DRAWINGS

Preferred embodiments of the present invention are hereinafter described, by way of example only, with reference to the accompanying drawings, wherein:

FIG. 16 is a schematic diagram illustrating the fifteen different types of instructions supported by the interactive system and process;

FIG. 30 is a screen shot of a user interface of the application gateway for entering scripting language instructions and for submitting those instructions to an instruction compiler of the application gateway;

FIG. 31 is a source code listing of a function illustrating how the system APIs can be used to send details of a booking to a mobile telephone for display to a user, and to receive the user's response indicating whether they user accepts or rejects the booking;

DETAILED DESCRIPTION OF THE PREFERRED EMBODIMENTS

Figure 1:
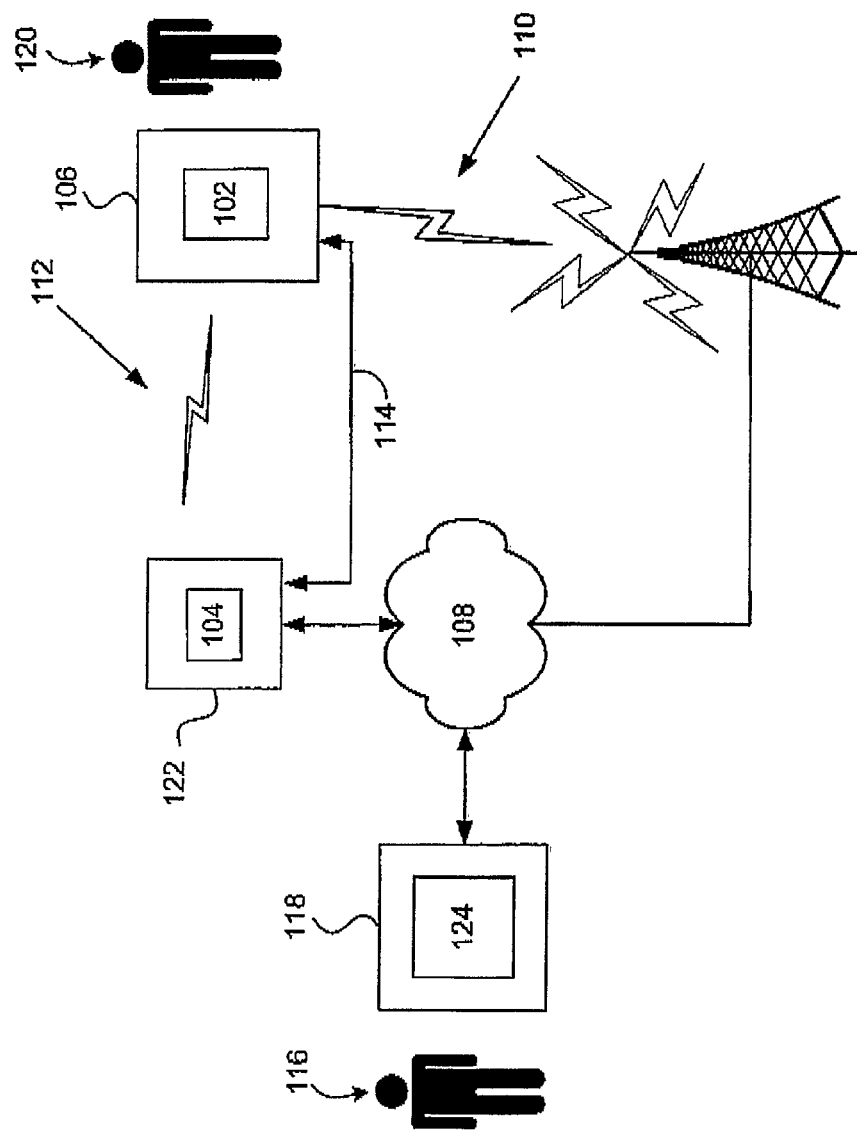
FIG. 1 is a schematic diagram of a preferred embodiment of an interactive system.

As shown in FIG. 1, an interactive system includes at least one client application 102 and at least one application gateway 104. Each client application 102 is a component of a corresponding user device 106 that can communicate with the at least one application gateway 104 via one or more of a variety of communications means supported by the device 106, preferably including a combination of (i) an IP-based communications network 108 such as the Internet, (ii) a wireless wide-area communications network such as the global system for mobiles (GSM) telephone network, (iii) a local wireless network or link between the device 106 and the at least one application gateway 104, such as an infra-red link, Wi-Fi or Bluetooth network 112, and/or (v) a direct cable connection 114 using a standard communications protocol such as RS-232, universal serial bus (USB), or FireWire (IEEE 1394). The interactive system allows an application developer 116 using a standard computer system 118 to rapidly develop and deploy an interactive workflow or application for execution on one or more user devices 106 in order to interact with the users 120 of those devices 106, and to receive response data representing at least one response of each user 120 to the interactive application.

The interactive workflow or application includes a set of instructions for presenting information to a user 120 of each mobile device 106 in an interactive display or user interface, and for retrieving each user's response(s) to that information. Typically, the information presented to a user 120 will include one or more questions displayed on a display screen of the user's device 106 (and possibly also audio played on a sound transducer of the device 106), and each of the user's responses is provided by the user interacting with one or more user-interface (UI) components or input controls of the interactive display. Each response can be in the form of freeform text typed into a textbox, or the result of the user interacting with another type of input control, such as radio buttons, check boxes, sliders, simple menus, nested menus, and so on. To some extent, these possibilities are determined by the capabilities of the device 106. However, because the workflow supported by the system also includes control flow features similar to those provided by high-level programming languages, the workflow instructions generated by the system are also considered to constitute an interactive software application that is executed on the user device 106.

In the described embodiment, the user device 106 is a mobile telephone, but alternatively could be some other type of portable or handheld device such as a personal data assistant (PDA), and hence is also referred to hereinafter as "The mobile device 106". However, even though the device 106 is described as being "mobile" or "portable", it will be appreciated by those skilled in the art that the systems and processes described herein could alternatively be used in conjunction with other types of devices and systems that need not even be portable. For example, the client application 102 could even be installed on a standard personal computer system (rather than the portable device 106) in order to rapidly develop and deliver interactive applications to a standard personal computer, for example.

In the described embodiment, the client application 102 is a software application that is stored on the mobile device 106, either as part of the device manufacturing or configuration prior to sale, or subsequently deployed as required via GPRS, Bluetooth, Infrared or a phone specific channel (e.g., a data cable), allowing it to be installed on a wide variety of different types of device, However, it will be apparent to those skilled in the art that the client application 102 and its processes could alternatively be implemented either in part or in total by one or more dedicated hardware components, such as application-specific integrated circuits (ASICs) or field-programmable gate arrays (FPGAs), for example.

Similarly, the application gateway 104 is a software application that is installed on and executed by a standard computer system 122, such an Intel™ IA-32 computer server executing a Windows™ operating system. The computer system 122 includes standard hardware components 702, and software components 704. The hardware components 702 include at least one processor 706, a communications interface (e.g., network interface card) 708, random access memory 710, non-volatile (e.g., hard disk storage) 712, user input device (e.g., keyboard, mouse or other pointing device) 714, and a display adapter and device 716, all interconnected by a system bus 720. The software components 704 include the application gateway 104, and a standard operating system 718 such as Microsoft Windows. Additionally, a third party application 124, shown as being installed on the developer's computer 118, may additionally or alternatively be installed on the same computer system 122 on which the application gateway itself is located 104, as shown. However, although the application gateway 104 is described as being a software application, it will be apparent to those skilled in the art that the application gateway 104 and its processes could alternatively be implemented either in part or in total by one or more dedicated hardware components, such as application-specific integrated circuits (ASICs) or field-programmable gate arrays (FPGAs), for example.

The client application 102:
  (i) verifies a set of instructions sent by the application gateway 104;
  (ii) interprets these instructions;
  (iii) interacts with the user device 106 and/or the user 120 in accordance with the set of instructions; and
  (iv) sends responses back to the gateway 104 or other computer system or device.

The application gateway 104 is effectively a backend component that:
  (i) maintains a database of user devices of the interactive system (i.e., devices on which the client application 102 has been installed);
  (ii) generates and delivers interactive applications to the mobile device 106 via any one of a wide range of communication channels;
  (iii) ensures the integrity and authenticity of outgoing and inbound messages to and from the mobile device 106; and
  (iv) provides application programming interfaces (APIs) to allow third-party applications 124 to deploy an interactive application to the mobile device 106 and to receive corresponding responses generated by the client application 102 on the mobile device 106.

Figure 2:
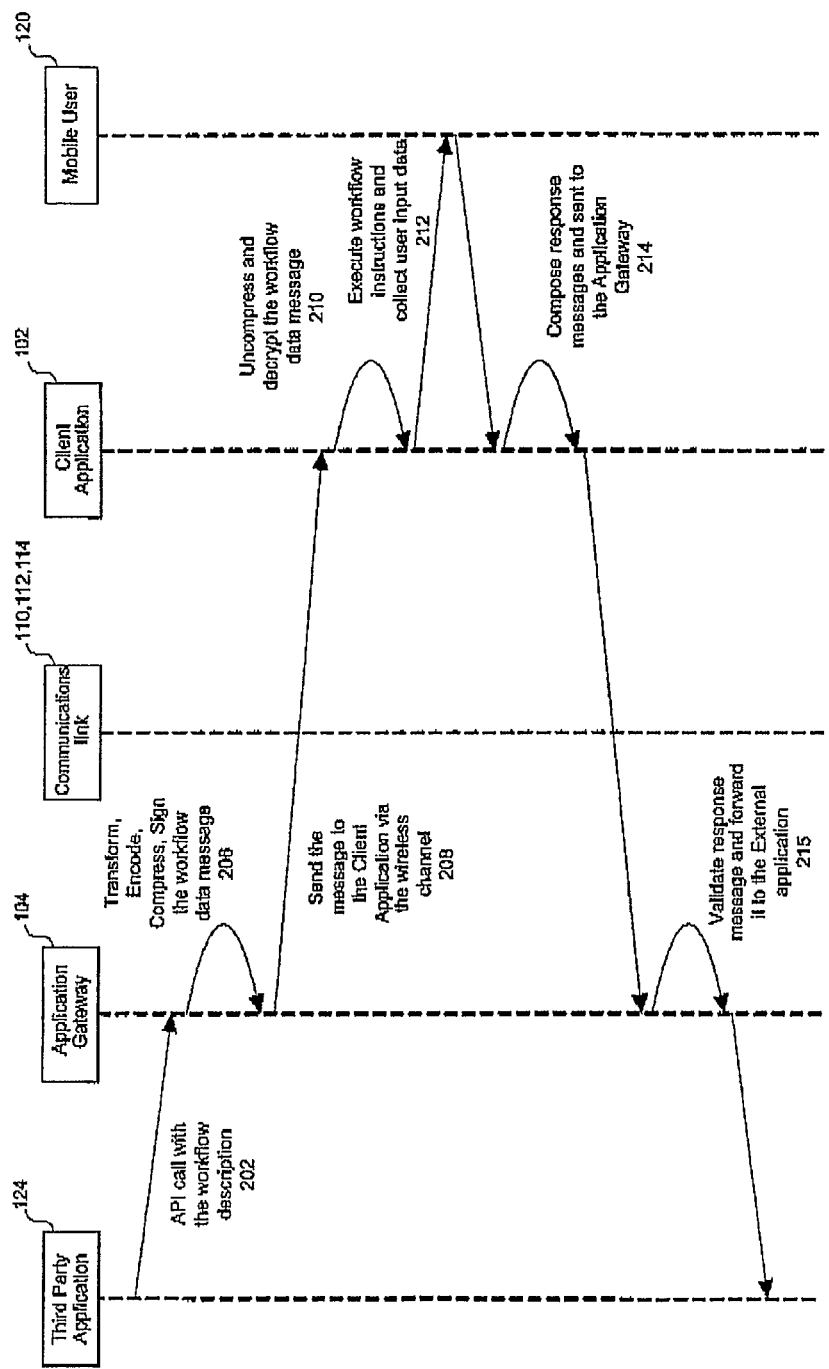
FIG. 2 is a schematic diagram of the high level process and data flow of an interactive process of the interactive system.

FIG. 2 is a schematic diagram illustrating the high level operation of the interactive process of the system in relation to the various components shown in FIG. 1. At step 202, an external or third-party application 204 executing on the developer's computer system 118 (or, alternatively, on the gateway computer system 122) calls an API 616 of the application gateway 104 to describe the workflow that the developers of the device 106 want to deploy. In general, the workflow includes the steps of displaying information to a user, and then retrieving at least one response to that information. For example, a typical workflow might be to display a message on the mobile device 106, ask the user to enter their age, then display another message, and send the ago back to the developer. These steps or instructions constitute an interactive application for execution on the mobile device 106.

The workflow defines:

(i) one or more addresses of respective user devices 106;

(ii) the steps to be performed on the one or more user devices 106;

(iii) the address of an alternate gateway server (if any) 104 to which responses are to be sent; if no address is given, then the responses will be sent to the same gateway server 104 that sent the application instructions;

(iv) how the response data returned to the application gateway should be processed (e.g., returned to the developer's application 124, sent to the developer 116 by email, stored in a file, etc.); and (v) the communication method(s) that are to be used to send the instructions to the user device 106 and to receive the corresponding response data.

At step 206, the application gateway 104 transforms the workflow described by the developer into a compressed, encoded, and encrypted format for transmission to the mobile device 106. The application gateway 104 also inserts a unique identifier or ID into the message and stores data associating that ID with the destination (e.g., phone number, or network address) to which the workflow is to be sent.

The application gateway 104 transforms the message so that it can be transmitted via the appropriate communication means. For example, if the message is to be transmitted via SMS, the application gateway 106 splits a large message into smaller messages to comply with the GSM standard. All this is hidden from the developer. At step 208, the application gateway 104 then transmits the message to the device 106 specified by the developer.

At step 210, the client application 102 receives, un-compresses and decrypts the message(s), thereby verifying their integrity. If valid, at step 212 the client application 102 interrupts the user and requests that they complete the workflow. With the user's cooperation, the client application 102 interprets each instruction and performs a corresponding operation e.g., display a message, collect the user's age, etc. that in most cases involves interacting with the user of the device 106.

At the end of the workflow, the client application 102 sends back to the application gateway 104 all the collected response data via the response channel specified in the workflow instructions by the application gateway 104. For example, if the response is to be returned via SMS, a response SMS is sent back to a phone number provided in the initial message(s). The client application 102 also encrypts the response message(s) and includes the unique message ID to ensure authenticity of the response.

When the application gateway 104 receives the response message at step 216, it decrypts the message and determines whether the ID of the message is valid for the phone number it was received from, using the destination and ID association stored previously. If the message is valid, then it is processed as specified by the developer e.g., passes it on to a third-party application, emails the developer, stores it in a file, etc.

In addition to the above, the interactive system also provides capabilities for (i) storing (and subsequently updating) a set of instructions as a permanent or semi-permanent application stored on non-volatile storage of the user device 106 for execution at any time; i.e., the application persists on the user's device; (ii) the distribution of encryption keys; and (iii) opt-in mechanisms to ensure that the mobile device 106 is not sent unsolicited applications, e.g., if the application gateway 104 is shared by multiple vendors.

The interactive system and the interactive process executed by the interactive system are described in detail below.

Figure 3:
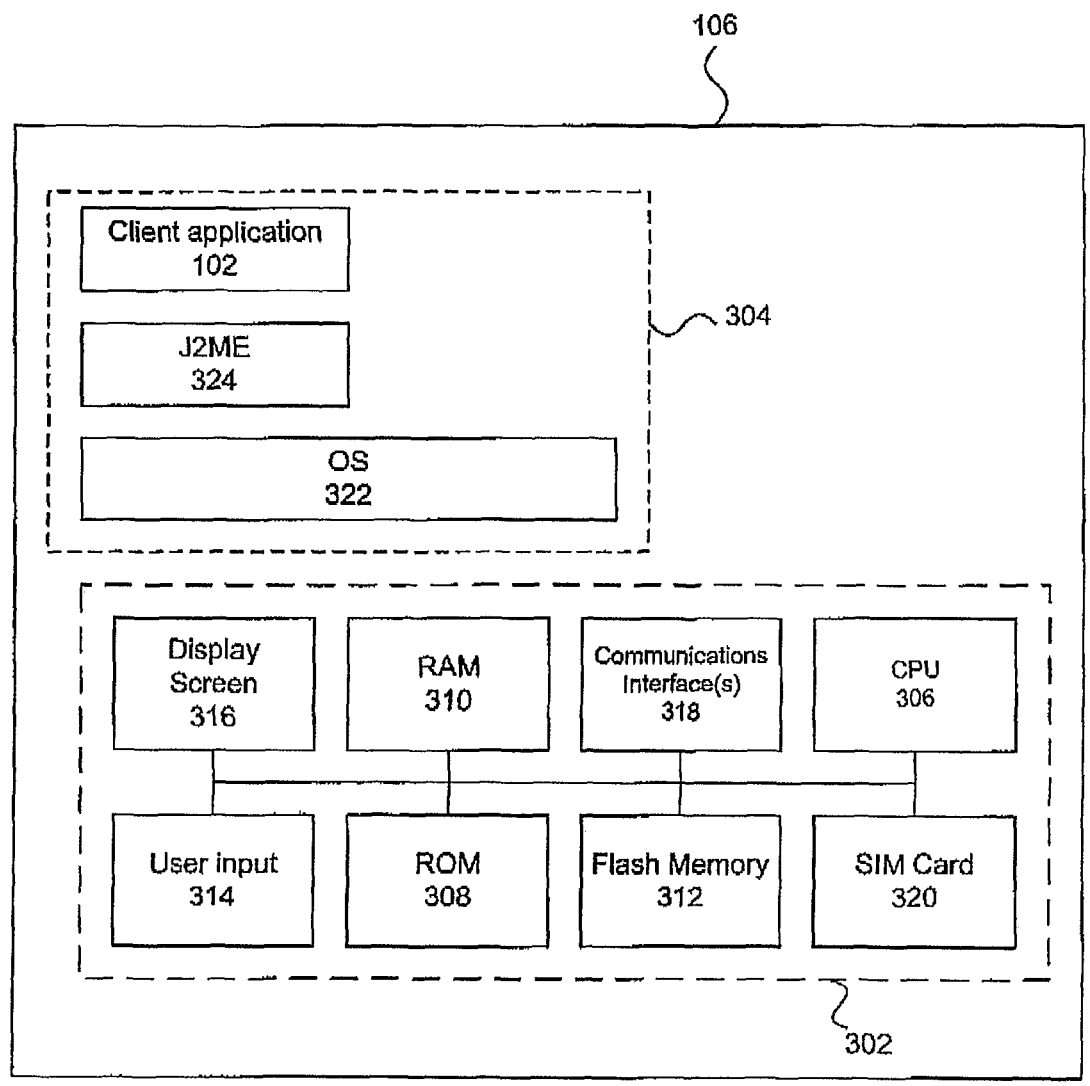
FIG. 3 is a block diagram of a mobile telephone on which a client application of the interactive system is installed.
Figure 4:
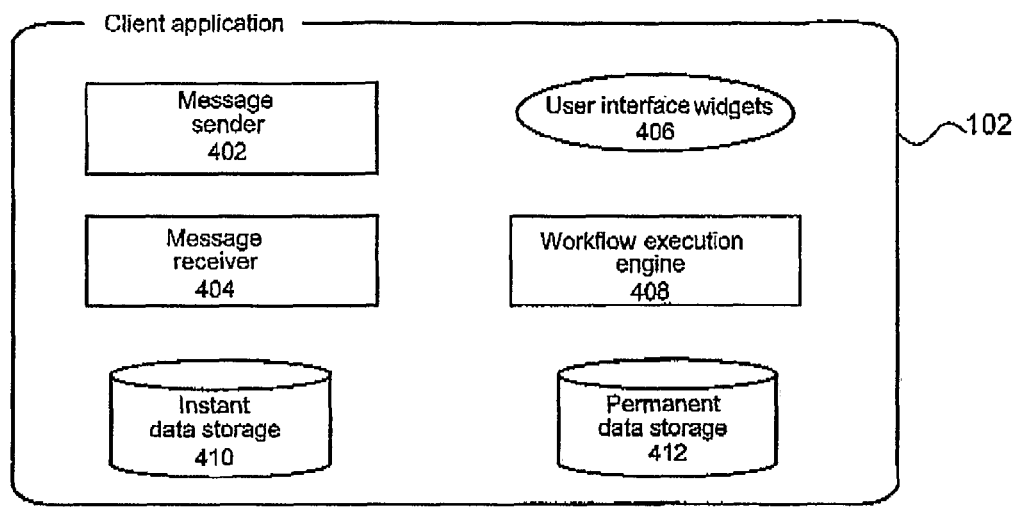
FIG. 4 is a block diagram of the client application of the interactive system.

As shown in FIG. 3, the mobile device 106 is a standard mobile phone including hardware components 302 and software components 304. The hardware components 302 include a processor 306, read-only memory 308, random-access memory 310, flash memory 312, user interface components including user input components 314 (e.g., microphone, keyboard, and, in some devices, touch-screen), output components 316 (e.g., display screen, speaker), and one or more communications interfaces 318 allowing the device 106 to communicate with a mobile phone network 110, and, in some devices, also Bluetooth and/or Wi-Fi local wireless networks or an infrared link 112. In the preferred case of the mobile device 106 being a telephone, the device 106 also includes a SIM card 320. The software components include an operating system 322 such as the closed, proprietary operating systems installed on mobile telephones sold under brands such as Nokia and Motorola, Java platform Micro-edition (Java ME) 324, and the client application 102. However, if the operating system 322 is a more sophisticated operating system such as Symbian, Linux, Microsoft Smart-Phone, PocketPC, Windows CE, or Windows Mobile, that provides sufficiently powerful application programming interfaces (APIs), then the J2ME component. 324 can be omitted. As shown in FIG. 4, the client application 102 includes a message sender component 402, a message receiver component 404, user interface (UI) widgets 406, a workflow execution engine 408, instant data storage 410, and permanent data storage 412. The client application 102 is a native application that is executed by the mobile device 106. The client application 102 can be installed by any one of a number of means, including WAP push, IP data packets (CPRS or 3G networks), Bluetooth, Infrared, or a phone-specific channel such as a data cable. The client application 102 can be provided as a preinstalled application on the mobile phone 106 when purchased.

The message sender 608 sends response messages to the application gateway 104 in a format understood by the application gateway 104. It encrypts the message and includes ID provided with the initial application to confirm its authenticity.

The message receiver 606 decrypts and uncompresses instruction sets received from the application gateway 104. It implements message reception via a number of channels, including Bluetooth, Infrared, IP networks (CPRS or 3G), and SMS. The message receiver 606 also invokes the workflow execution engine 408 to process the instruction set.

The UI Widgets 406 are pre-built user interface components that instructions sent by the application gateway 104 can use to interact with the user.

The workflow execution engine 408 is responsible for running and maintaining state for the instructions currently being processed. It associates instructions with UI widgets as well as storing input from the device 106 and its user. It is also responsible for invoking the message sender 402 once the workflow is completed to initiate sending the response to the application gateway 104. The workflow execution can also be invoked by a timer if an instruction asks to be run at a specific time.

The client application 102 can simultaneously receive multiple workflow applications at any one time, and the instant data store 410 is effectively a first-in, first-out queue that stores these applications and processes them one by one until the instant data store 410 is empty.

The interactive system has the ability to make a sequence of instructions persistent on the mobile device 106 as an application. These sequences are identified by a unique label and are stored in the permanent data store 412, being in this embodiment the non-volatile flash memory 312. The application gateway 104 can issue commands to update or delete applications in the permanent data store 412.

Figure 5:
FIG. 5 is a flow diagram of the life cycle of an interactive application generated by the interactive process and system.

FIG. 5 is a flow diagram illustrating the life cycle of an execution instance of the client application 102 following receipt of an instruction from an application gateway 104. However, the client application 102 can be invoked at step 502 by either a new data event or a timer event. A new data event occurs when the client application 102 is activated by the mobile device 106 when new payload data addressed to the client application 102 is received. Timer events are set by a specific instruction that suspends execution of the instruction to a later date/time. The workflow engine 408 is responsible for scheduling the client application 102 to start and process the instruction set at that date/time.

Once invoked, at step 504 the instruction sequence is retrieved either reading data from the instant data store 410, in the case of a Timer event, or from the input channel in the case of a new data event. If the instruction data is retrieved from the input channel and is encrypted, at step 506 the client application 102 decrypts and verifies it as described below. If the data is valid, the workflow execution begins at step 508.

The workflow execution 508 processes the instructions step by step. This may or may not involve user interactions (as some instructions described in the Appendix can be handled without user interaction). Upon execution of a timer instruction specifying that execution should be postponed to a later time, further execution of instructions of the workflow application is suspended and the instruction set is stored placed in the instant data store 410 pending resumption at the specified time.

Once the workflow execution 508 is complete, the workflow application is removed from the instant data store 410. If the application is marked as persistent, the instruction set is saved to the permanent data store 412. The user can then invoke the instruction set at any time.

At step 510, the information collected by the workflow execution 508 is sent back to the application gateway 104 as response data. The client application 102 encrypts the response data in addition to including the unique message ID that verifies the authenticity of the response data.

Figure 6:
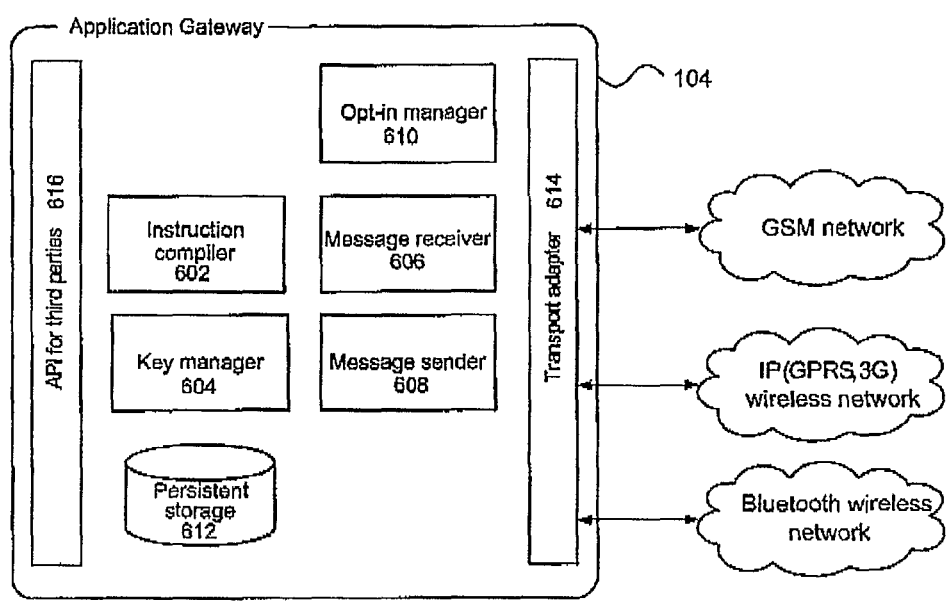
FIG. 6 is a block diagram of an application gateway of the interactive system.
Figure 7:
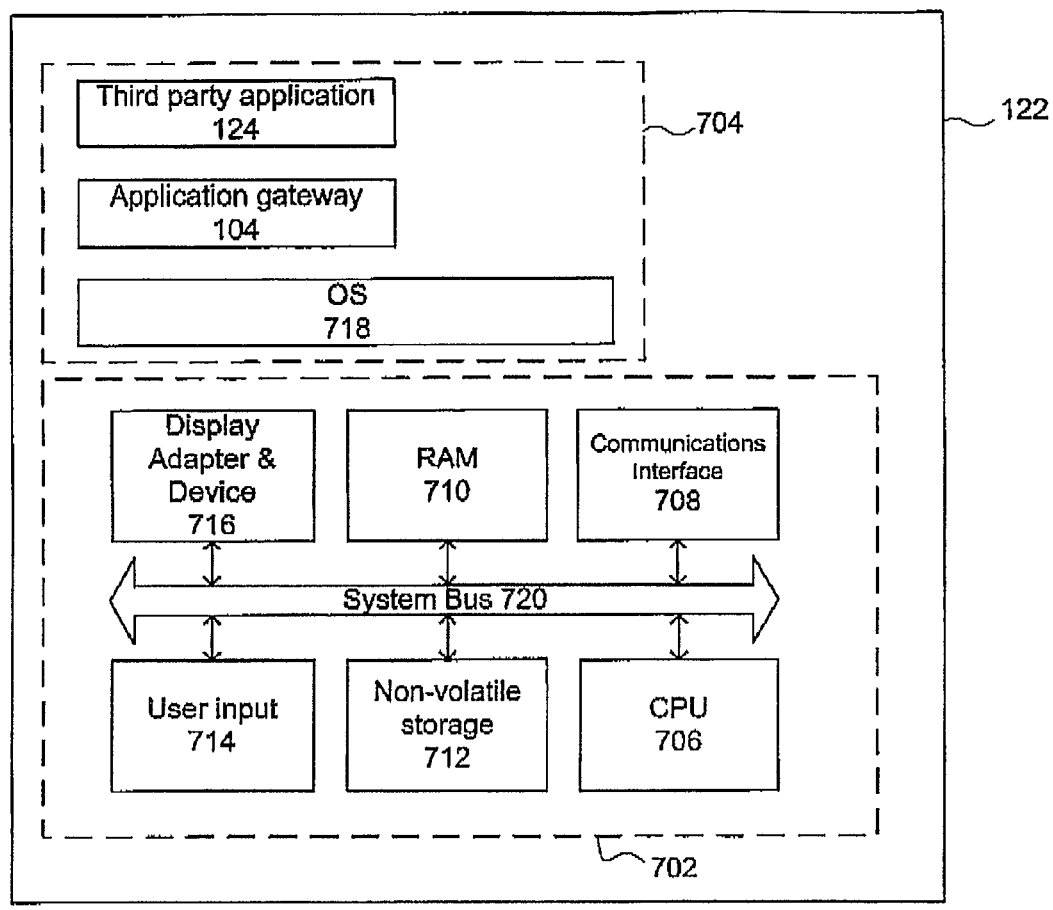
FIG. 7 is a block diagram of a computer system on which the application gateway is installed.

As shown in FIG. 6, the application gateway 104 includes an instruction compiler 602, a key manager 604, a message receiver 606, a message sender 608, an opt-in manager 610, persistent storage 612, and an application programming interface (API) 616.

The instruction compiler 602 translates workflow descriptions received from the developer 116 into a format that is optimized for delivery to and execution by the client application 102. The workflow description is written in a scripting language that is compiled by the instruction compiler 602. The developer can enter the workflow description directly into a text box and submit its contents to the compiler 602. This is typically used to rapidly prototype the look and feel of a workflow application. Alternatively, the workflow description can be submitted by making an API call to the compiler 602 from a high-level programming language such as C#, Java, or TCL, thus providing end-to-end application integration, The message sender 608 encrypts the workflow instruction set. The encryption relies on requesting the key manager 604 to provide a random index and an encryption key that is specific to a particular user device 106 on which the instructions are to be executed. The index is sent in cleartext to the client application 102, which uses the index to look up the appropriate encryption key to decipher the message. The message sender 608 also generates a unique random identifier for the workflow application. The random identifier is a combination of a random identifier and an identifier of the party who sent the workflow description.

The message sender 608 uses the transport adapter 614 to deliver the actual message(s) containing the workflow application. The message sender 608 first checks with the Opt-in manager 610 to ensure that the client application 102 does not receive unsolicited applications which it has not opted into, as described below.

The transport adapter 614 abstracts the various methods of delivering an instruction set to the client application 102 on the mobile device 106. It uses device capability information stored in the persistent storage 612 to determine the capabilities of the device 106 and hence the best communication channel to deliver the message(s).

The transport adapter 614 provides plug-in support for new channel types dynamically by providing a set of messaging APIs and by allowing dynamic loading of compiled code that implements a new messaging interface. If required, the transport adapter 614 reformats the instruction payload so that it can be delivered via a particular channel. In particular, an application delivered by SMS may have to be divided into two or more smaller messages due to SMS message size limitations.

The key manager 604 is responsible for generating, distributing and managing the encryption keys issued to the portable device 106, as described below. It also provides encryption and decryption facilities for the message sender 608 and the message receiver 606.

Figure 8:
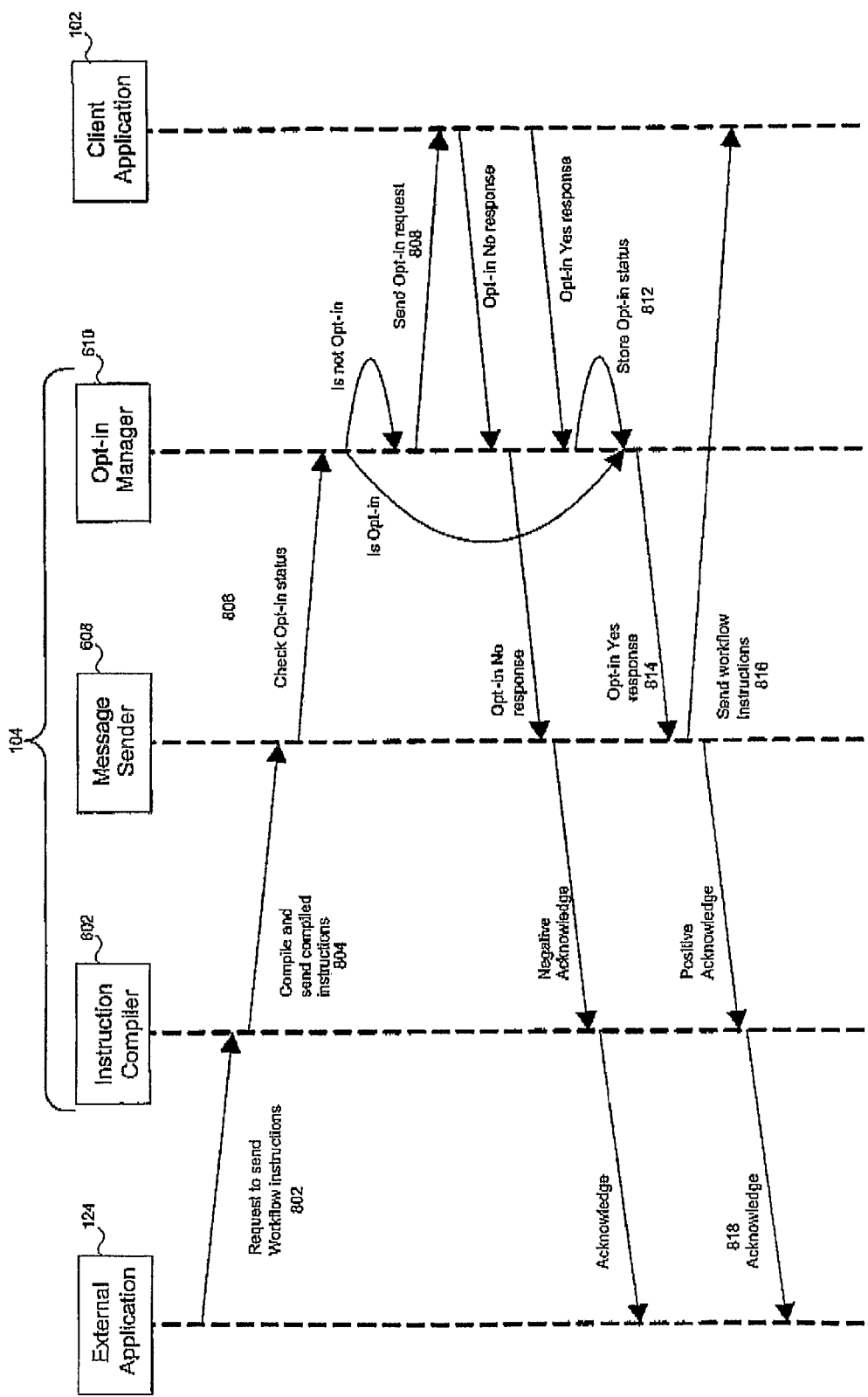
FIG. 8 is a schematic diagram of the process and data flow of an opt-in process of the interactive system.

The opt-in manager 610 provides an opt-in, opt-out process to allow client applications 102 select the entities they are willing to receive instruction sets from. This is desirable because the application gateway 104 may be shared by multiple parties and the client application 102 will otherwise execute any received instruction set as long as it is valid. The opt-in manager 610 maintains in the persistent data store 612 associations between parties and the phone numbers (or, in the case of devices other than telephones, other form of address or identifier of the destination device) they are allowed to send applications to. The process for creating these associations can be dynamic to allow users to selectively block or allow instructions from particular parties. For example, FIG. 8 shows the message flow for an opt-in process.

At step 802, a party uses the external application 124 executing on the computer system 118 to send a workflow description to the application gateway 104, which at step 804 compiles and formats the instructions in preparation for sending them to a client application 102 that has not opted in. At step 806, the message sender 608 first checks whether the client application 102 has opted in. If not, at step 808 it asks the opt-in manager 610 to determine the opt-in status for this party and this user device. At step 810, the opt-in manager 610 sends an opt-in request message to the user, asking whether they agree to receive applications from this party. If the response is yes, at step 812 the opt-in manager 610 stores this information in the persistent data store 612 and then at step 814 instructs the message sender 608 to send the instruction set at step 816. Otherwise, if the response is no, then the message sender 608 fails and notifies the party at step 818 that the user has not opted in.

Alternatively, the opt-in process could be performed manually, for example, by using a form that enables the user to directly add entries to the persistent data store 612. Alternatively, an analogous process could be used to opt-out of receiving applications from a particular party.

The message receiver 606 receives messages from the client application 102 and communicates with the transport adapter 614 to receive responses via any of the supported transport channels and protocols, including GPRS, IP network, Bluetooth, and SMS. For example, the instruction set of the interactive system allows instructions to be received by one physical channel/protocol (e.g., SMS), and a corresponding response to be delivered by another (e.g., Bluetooth).

When a message is received, the message receiver 606 first logs the message for audit purposes. Then it checks the authenticity of the message by deciphering the message using the key manager 604, and examining the unique message ID and the party ID to confirm that they match what was sent out.

Once the message authenticity is established, the message receipt is logged for billing and auditing purposes. Finally, the response message is processed as required by the party. This may include emailing the party; logging it to a file for the party to collect; and/or making a request to a third-party application to process the message. The actual method(s) used to process the response message can be specified when calling the API. If the API call does not specify a processing method, then the response is processed using the default method configured for the corresponding developer, determined when the developer establishes an account with the provider of the interactive system.

The persistent storage 612 is a non-volatile storage component that is used by:
 (i) the key manager 604 to store the encryption keys for the various mobile devices;
 (ii) the message sender 608 to store the addresses of user devices 106 (e.g., phone numbers in the case of the device 106 being a telephone), together with the delivery mechanisms that each user device 106 supports. It also stores the identifiers of the messages that have been sent out, for verification purposes;
 (iii) the message receiver 606, to store received messages for audit and billing purposes; and
 (iv) the opt-in manager 610, to store opt-in data representing each user device 106 and the third party applications that are authorised to send instructions to each user device 106.

Encryption Keys

As described above, each installed instance of the client application 102 on a user device 106 is identified by a unique client identifier (also referred to herein as the client ID number) that is associated with its phone number. When a client application 102 is first installed on a mobile device 106, a number of private encryption keys are generated and associated with the client ID.

Figure 9:
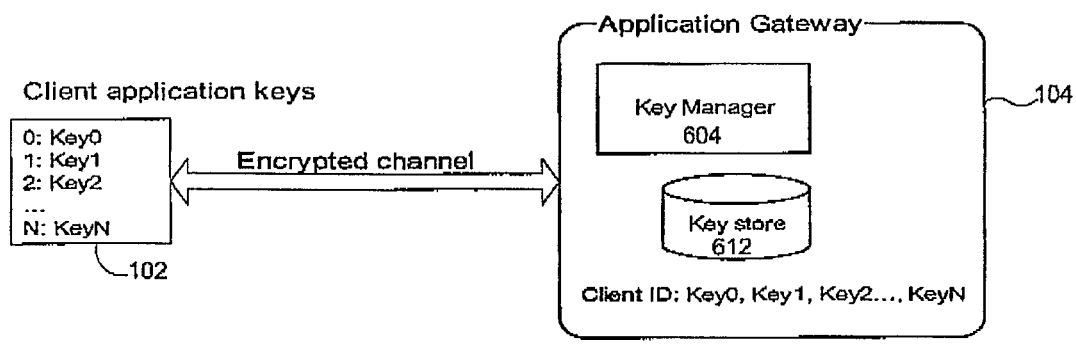
FIG. 9 is a schematic diagram illustrating the use of encryption key sets to establish an encrypted communications channel between the client application and the application gateway.

As shown schematically in FIG. 9, these encryption keys are then used by the client application 102 to authenticate the payload data and to encrypt the response data. On each payload or response data packet or message, the index of the appropriate encryption key is indicated in the header of the payload.

Figure 10:
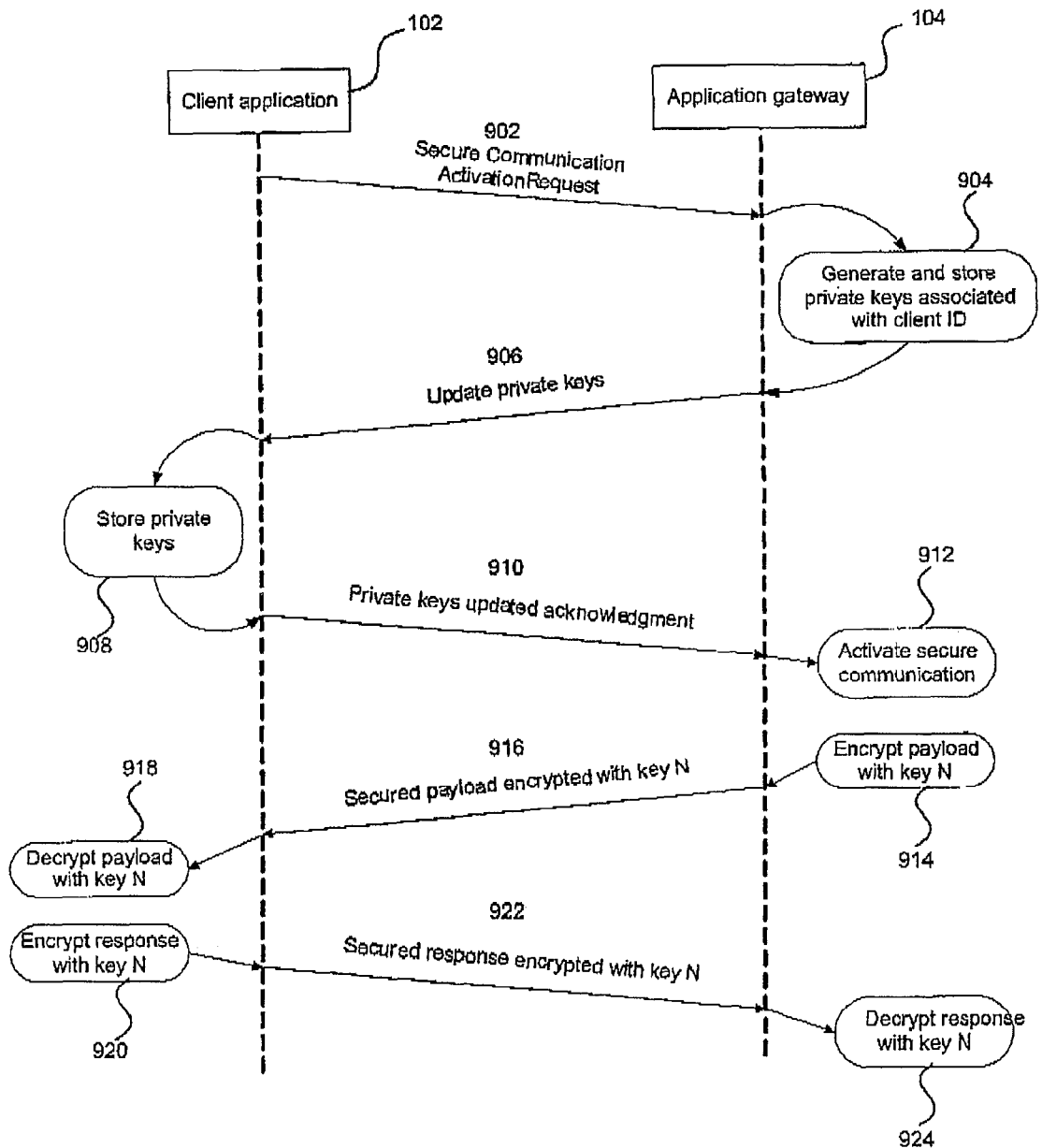
FIG. 10 is a schematic diagram of the process and data flow involved in conducting secure communications between the client application and the application gateway.

FIG. 10 is a schematic diagram illustrating the message and process flow for generating and updating encryption keys on a client application 102 and an application gateway or backend system 104. The process is initiated by the client application 102 making a secure communication activation request to the application gateway 104 at step 902. In response, the application gateway 104 generates and stores a set of private encryption keys, and associates these with the client ID at step 904. At step 906, the application gateway 104 sends these newly generated private keys to the client application 102.

The client application 102 stores the received private keys on the persistent storage 412 at step 908, and returns an acknowledgement to the application gateway 104 at 910, confirming that the private keys have been stored (or updated if the keys had been previously stored). This completes the generation/update steps and secure communication is activated at step 912. This involves encrypting a message payload using one of the private encryption keys, which can be selected at random or on any other basis at step 914. At step 916, the secured payload encrypted with the selected key is sent to the client application 102, together with a message header specifying the index of the selected encryption key. At step 918, the client application uses the encryption key index indicated in the header to select the appropriate private key, and uses that key to decrypt the payload data at step 918. After performing the application instructions specified by the payload, the client application 102 then encrypts the response at step 920. The response can be encrypted using the same key, as shown in FIG. 10, or any other of the stored keys. The secured response is sent to the application gateway 104 at step 922, and the response is decrypted using the appropriate response key at step 924. As will be understood by those skilled in the art, the use of private encryption keys greatly improves the security of communication, and the use of a set of encryption keys, rather than a single key, further increases this security.

Figure 11:
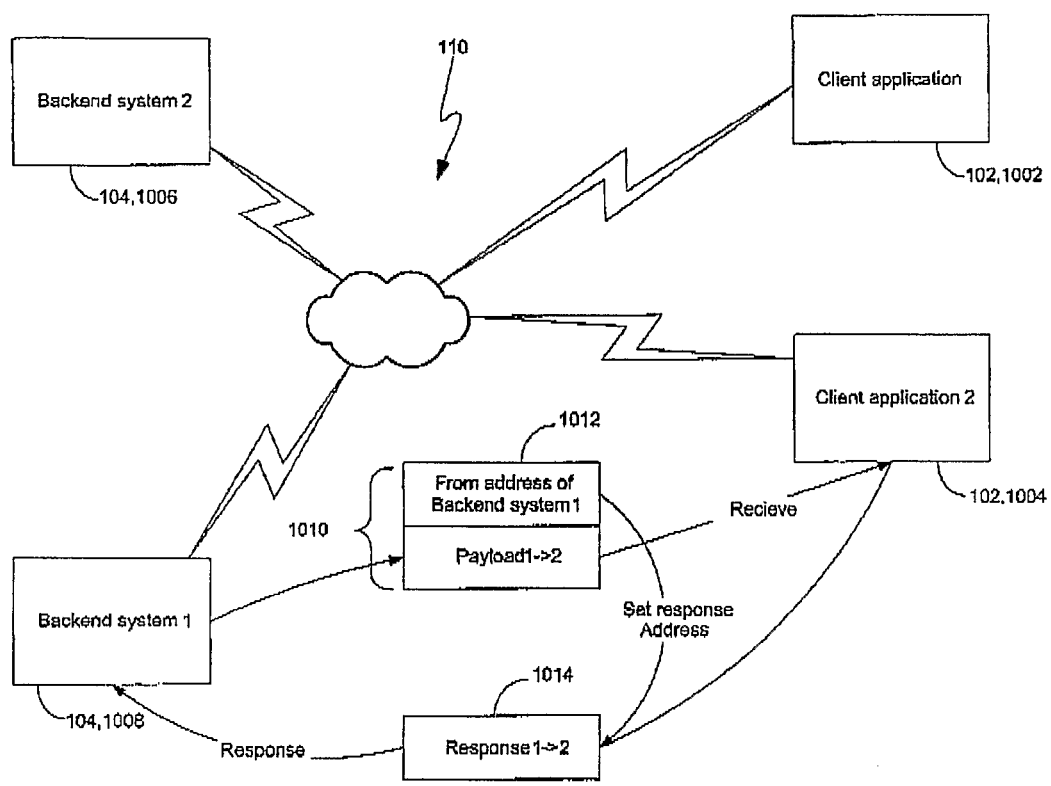
FIG. 11 is a schematic diagram illustrating the default behavior of the interactive system and process whereby a particular application gateway transmits instructions to a particular client application, and the resulting response data is returned to the same application gateway that sent the instructions.

When sending a response message, the client application 102 uses the source address of the corresponding payload data by default. This effectively provides multiple client-server communication channels in between the backend 104 and the client application 102. For example, FIG. 11 shows an arrangement whereby two instances of the client application 102, a first instance 1002 and a second instance 1004, are in communication with two instances 1006, 1008 of the application gateway 104, via a wireless communications network 110. A message 1010 sent from the first backend system 1008 to the second client application 1004 includes an address 1012 of the first backend system 1008 in the header of the message 1010 so that when the client application 1004 sends the corresponding response 1014, it is addressed to the first backend system 1008.

Figure 12:
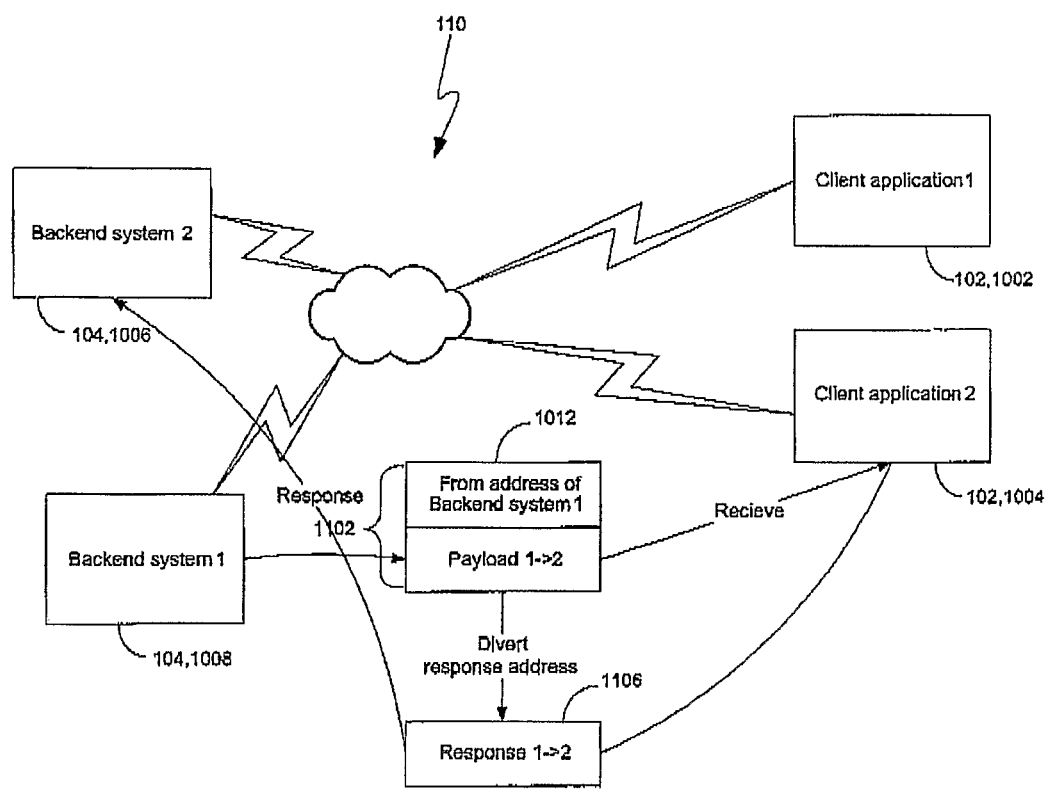
FIG. 12 is a schematic diagram similar to that of FIG. 11, but illustrating the redirection of response data to a different application gateway from the application gateway that sent the corresponding instructions.

In contrast, FIG. 12 shows the same arrangement whereby a message 1102 also includes the address 1012 of the first backend system 1008. However, workflow instructions contained in the payload data can alter this default behavior by redirecting the response to another backend server instead. This mechanism is activated by a DIVERT command in the payload data, described further in the Appendix. Specifically, in this message 1102 the payload 1104 includes a divert instruction with the address of the second backend system 1006. Consequently, after the second client application 1004 executes this instruction, the response 1106 is addressed to the second backend system 1006, rather than the first backend system 1008 that originated the message 1102 containing the instructions. Because the second backend system 1006 does not have direct access to the client ID and message ID pair, or the encryption keys for the client application 102, the second backend system 1006 calls an API of the first backend system 1008 to check the integrity and authenticity of the response data. If the payload was encrypted, then the first backend system 1008 decrypts the payload and sends it back to the second backend system 1006 over a secured communications channel (using SSL, for example). In an alternative embodiment, the encryption keys are stored in a centralised component of the interactive system, and all encryptions and decryptions are performed in this manner.

Communication Data Payload

The payload exchanged between the client application 102 and the backend system 104 is binary data—a sequence of bytes. The communication channel for this payload can include SMS or Cell Broadcast Service (CBS) messages; IP/TCP data packets (over GPRS, 3G or other type of data networks); and/or Bluetooth data packets.

Figure 13:
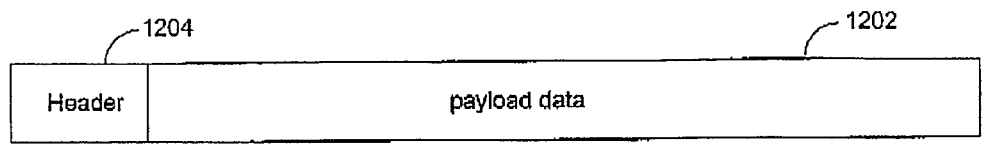
FIG. 13 is a schematic diagram illustrating the structure of messages exchanged between the application gateway and the client application.

As shown in FIG. 13, each data payload is prefixed with a header 1204 which indicates whether the payload is encrypted with an encryption key. The header data contains the index of the encryption key stored in the client application key-storage, thereby allowing the client application 102 to decrypt the payload data.

Figure 14:
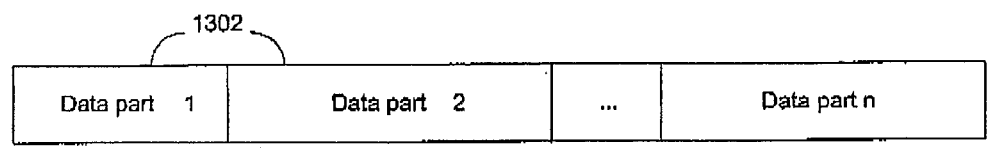
FIG. 14 is a schematic diagram illustrating the structure of payload data of the messages shown in FIG. 13.

As shown in FIG. 14, plain payload data (either unencrypted or after being decrypted) contains a series of variable-length data parts that instruct the dynamic workflow execution engine 508 of the client application 102 to construct the user UI workflow.

Figure 15:
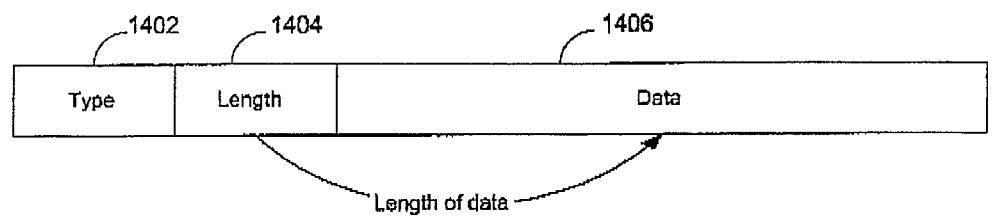
FIG. 15 is a schematic diagram illustrating the structure of each data part of the payload data of FIG. 14.

As shown in FIG. 15, each data part includes type 1402 and length 1404 data fields, followed by the actual instruction data 1406. The type field is a single octet or byte that defines the type of workflow instruction that follows. The length indicates the number of octets or bytes of the instructor data 1406.

Figure 17:
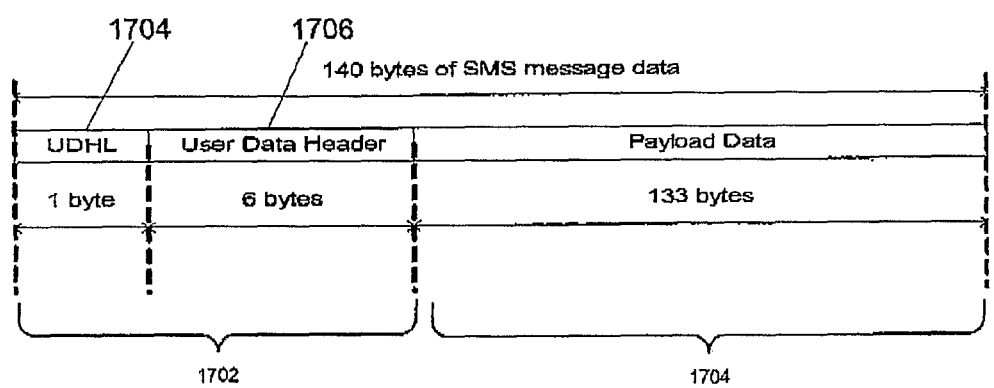
FIG. 17 is a schematic diagram illustrating the structure of an SMS message generated by the interactive system and process.

As described above, the interactive system is able to use one or more of a variety of different communication channels for sending and receiving messages and responses between the application gateway 104 and the client application 102. For most of these different communication channels, the communication itself is straightforward, using the standard methods and libraries available and known to those skilled in the art. However, the interactive system supports message and response delivery via the short message service, or SMS. SMS is defined in the GSM 03.40 specification, which defines an upper limit on the size of each SMS message. Specifically, each SMS message is capable of containing up to 140 bytes of data, equivalent to 160 ASCII characters when using 7-bit encoding, as shown in FIG. 17. The interactive system sends SMS messages including 8-bit (binary) data and including a 7-byte user data header or UDH 1702, as described in the GSM 03.40 specification. The UDH 1702 consists of a length field or UDHL, 1704, specifying the length of User Data Header in bytes as specified in GSM 03.40, and a 6-byte User Data Header field 1706 specifying the destination address of the payload data 1708.

The UDH data 1702—specifying the destination of the binary message—is interpreted by the mobile device to deliver the payload data to the client application 102. Excluding UDH data 1702, each SMS message is capable of carrying 133 bytes of payload data 1708.

Figure 18:
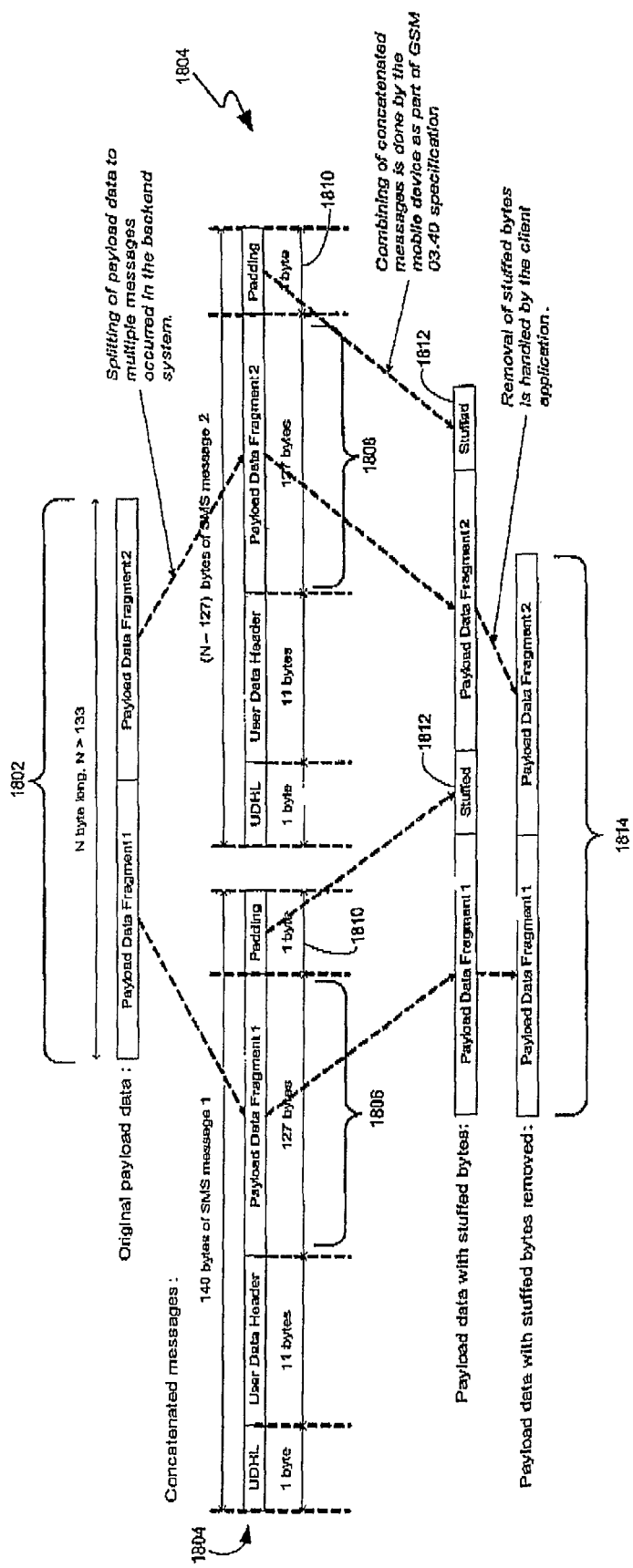
FIG. 18 is a schematic diagram illustrating how the interactive system uses multiple SMS messages to transmit instructions constituting an application whose length is greater than 133 bytes.

If the payload data exceeds this length, the payload data is sent in two or more SMS messages 1804, each message containing up to 127 bytes of payload data 1806, 1808, as shown in FIG. 18. These SMS messages 1804 have a section of User Data Header indicating that they all belong to a concatenated message, as described in the GMS 03.40 specification. A byte padding mechanism is used by the backend system 104 and the client application 102 when the payload is sent in multiple SMS messages. In this mechanism, a padding or termination byte 1810 with value 0xFF is appended to the end of each payload data fragment 1806, 1808 when sent out from the backend system 104. The client application 102 removes these padding bytes 1810, which appear as stuffed bytes 1812 in the concatenated payload data before passing the payload data 1814 to the workflow execution engine 408. The byte padding mechanism is used to eliminate problems found in a number of mobile phone models that strip out the last byte of every concatenated data fragment.

Figure 19:
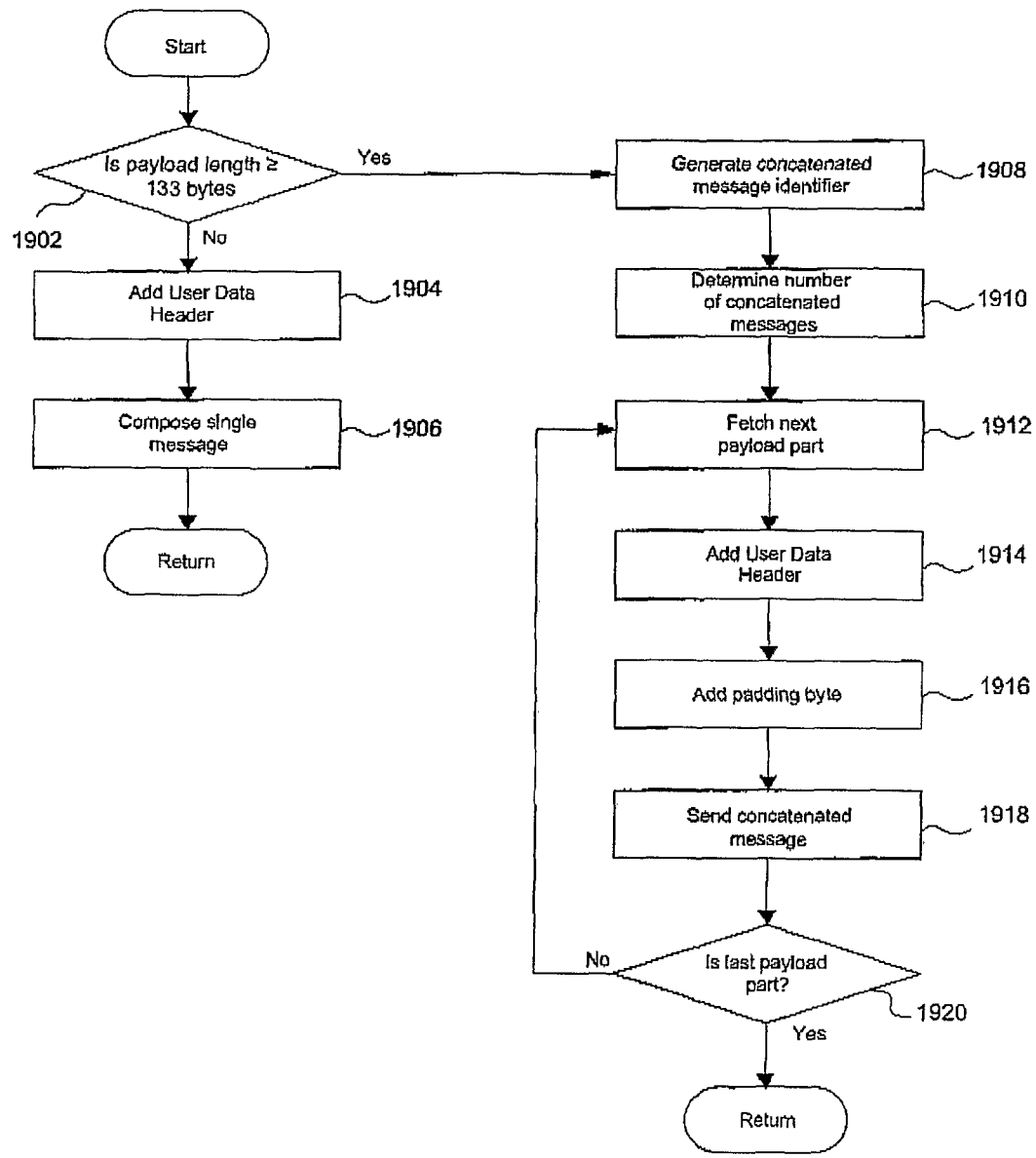
FIG. 19 is a flow diagram of an SMS transmission process of the system.

The instruction compiler 602 creates the payload data from the compiler output to generate binary SMS messages. Construction of binary messages includes splitting the payload data 1802 into multiple SMS messages 1804 if the data length exceeds the single message capacity of 133 bytes. FIG. 19 is a flow diagram showing the steps involved in this process.

As shown in FIG. 19, when delivering a message or a response via SMS, at step 1902 a check is performed to determine whether the size of the payload data exceeds 133 bytes. If not, then at step 1904 a user data header is added, and a single SMS message is composed and sent at step 1906. Alternatively, if the payload length does exceed the maximum size that can be sent in a single SMS message; then at step 1908 a concatenated message identifier is generated, and at step 1910 the number of concatenated messages that are required to accommodate the payload data is determined. Then, a processing loop consisting of steps 1912 to 1920 composes the appropriate number of SMS messages as follows. At step 1912, the next payload portion is selected and copied to the payload of the current SMS message. At step 1914 a user data header is added, including the identifier indicating that the SMS message is part of this SMS message set. At step 1916, a padding or termination byte is appended to the payload data, as described above. Finally, at step 1918 the resulting SMS message is sent. These steps 1912 to 1918 are repeated until the test at step 1920 determines that the last part of the payload data has been sent, and the process then terminates.

Figure 20:
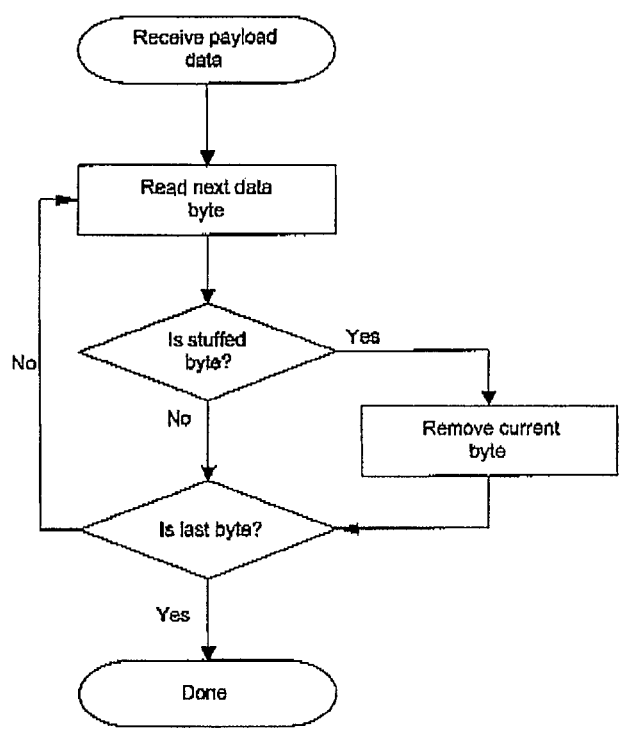
FIG. 20 is a flaw diagram of an SMS receiving process of the system.

Removal of stuffed bytes in the payload data is handled by the client application 102 by searching for the specific stuffed byte octet value (0xFF in this embodiment) and removing it from the payload data, as shown in FIG. 20.

FIG. 16 is a schematic diagram showing the fifteen different instructions supported by the interactive system, showing the respective type bytes identifying each instruction type, and the structure of the corresponding instruction parameters. Further details on the various instructions are provided in the Appendix.

Dynamic Workflow Execution Engine

The client application 102 presents to the user a number of user interface (UI) widgets 406 as well as executing user-invisible routines. This allows the client application 102 to display information as well as capture device information and/or user inputs.

The UI widgets 406 typically include the following type of user interface components and controls:
 (i) Message screen: to show textual information;
 (ii) Selection menu: to ask for the user's selection of one of a number of defined choices (i.e., radio buttons);
 (iii) Multiple choices: to ask for user's one or more choices (i.e., check boxes);
 (iv) Textual input: to retrieve free form text input from the user (textbox);
 (v) Numeric or date inputs: to retrieve user input data, restricted by type; and
 (vi) Widgets displayed when branching and jumping amongst execution steps.

However, this list of UI widgets 406 and their actual screen layouts can vary depending on the platform (i.e., on each combination of device hardware and operating system software) on which the client application 102 is installed.

Figure 21:
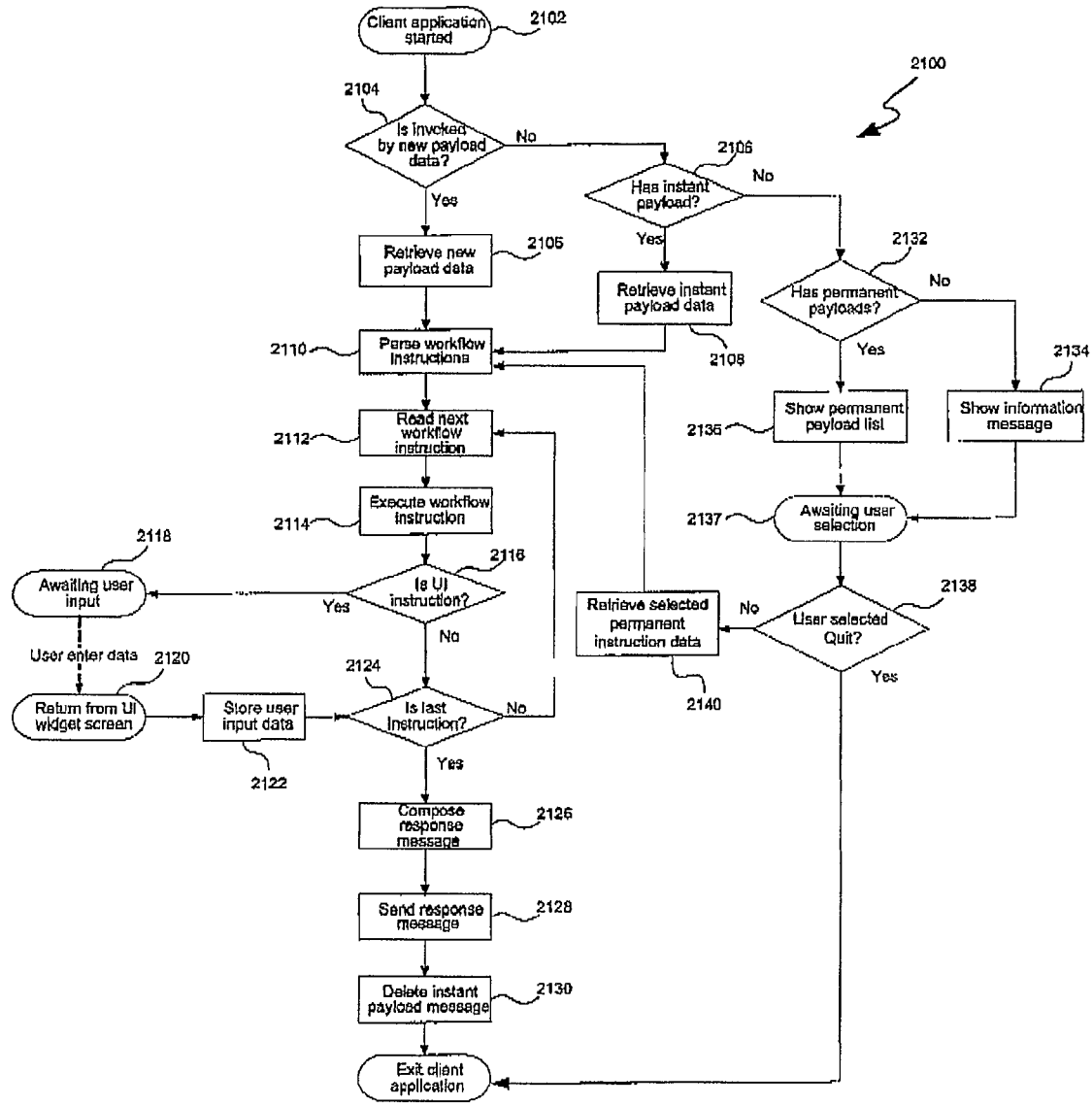
FIG. 21 is a flow diagram of an application execution process executed by the execution engine of the system.

The client application 102 implements a workflow execution process 2100, as shown in FIG. 21, on each invocation to execute a workflow application. The workflow execution process 2100 begins after the client application 102 is invoked at step 2102, and a test is performed at step 2104 to determine whether the invocation has resulted from the receipt of new payload data from the application gateway 104. If so, then at step 2105 the new payload instructions are retrieved, and then parsed at step 2110. Otherwise, if the invocation was not due to the receipt of new payload data, then a test is performed at step 2106 to determine whether instructions are contained in the instant data storage 410. If so, then the instructions are retrieved from the instant data storage 410 at step 2108, and then parsed at step 2110. Otherwise, another test is performed at step 2132 to determine whether any sets of instructions have been saved as applications in the permanent data storage 412. If not, then at step 2134 an information message is displayed to the user indicating that there are no applications (instant or permanent) in the queue. Once the user acknowledges this information message, or when a corresponding timeout period has elapsed, the client application 102 is terminated. Alternatively, if the permanent data storage 412 contains one or more permanently stored sets of instructions (i.e., applications), then at step 2136 these are displayed to the user, and the process 400 pauses at step 2137, awaiting the user's selection of one of these, or selection of a quit option. If, at step 2138, it is determined that the user has selected the quit option, then the client application 102 terminates. Otherwise, the user has selected a permanently stored set of instructions, and these are retrieved at step 2140, and then parsed at step 2110.

Following parsing of the workflow instructions at step 2110, the first or next workflow instruction is read at step 2112, and executed at step 2114. If it is determined at step 2116 that the instruction is a UI instruction, then the process waits to receive user input at step 2118. Once the user's response has been received, at step 2120 the UI widget displayed on the screen of the device 106 is remove& and any user input is stored at step 2122. At step 2124, a test is performed to determine whether the instruction was the last in the workflow. If not, then the process loops back to step 2112. Otherwise, once all of the instructions have been executed, then a response message is composed at step 2126, and sent at step 2128. If the workflow instructions executed are stored in the instant data storage 410, then they are deleted at step 2130. This terminates the workflow execution process 2100.

Parsing Workflow Instructions and Response Data

The workflow execution engine 408 of the client application 102 interprets the payload data parts and generates the dynamic UI workflow accordingly.

Figures 22, 23:
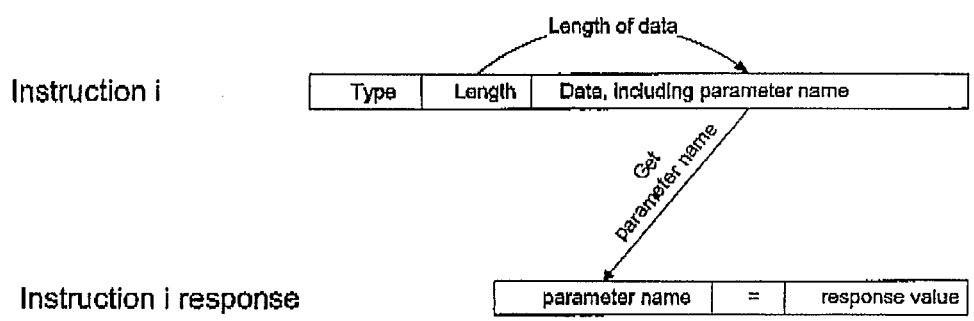
FIG. 22 is a schematic diagram illustrating the structure of response data sent from the client application to the application gateway.
FIG. 23 is a schematic diagram illustrating how the system uses parameter names provided in instructions to label corresponding responses.
Figure 24:
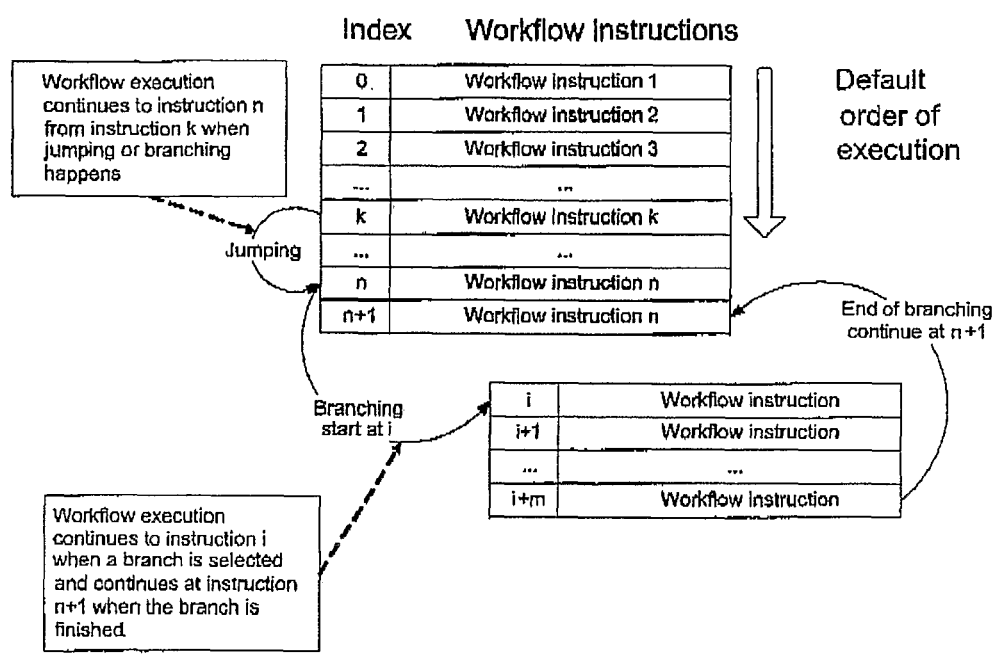
FIG. 24 is a schematic diagram illustrating execution branching in the client application.

The data parts from the payload data are indexed sequentially when read by the workflow execution engine 408, and, this is also the default order of workflow execution 508. As shown in FIG. 22, the response data includes each response in the same order as the corresponding instructions were received and executed. When a workflow instruction is executed and response data is to be retrieved, a parameter name is included in the instruction data, and the user response or system response is associated with this parameter in the response. All the instruction responses are included in the response data when the workflow is completed, as shown in FIG. 23.

Jumping and Branching in the Workflow

The workflow execution engine 408 provides a mechanism to allow branching and jumping in the sequence of instructions.

Branching

Figure 25:
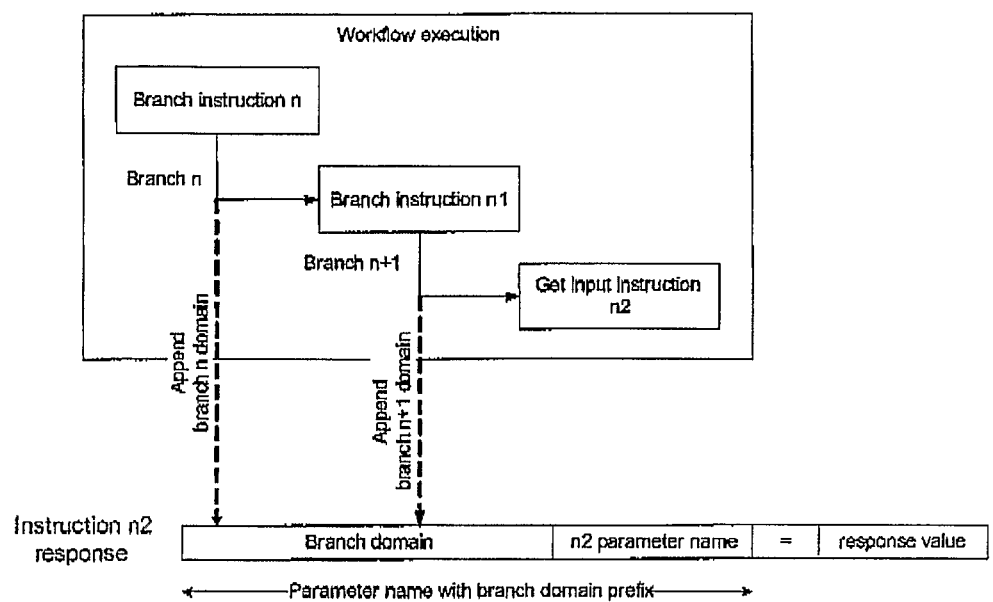
FIG. 25 is a schematic diagram illustrating the use of branch domains to label responses having the same parameter name.
Figure 26:
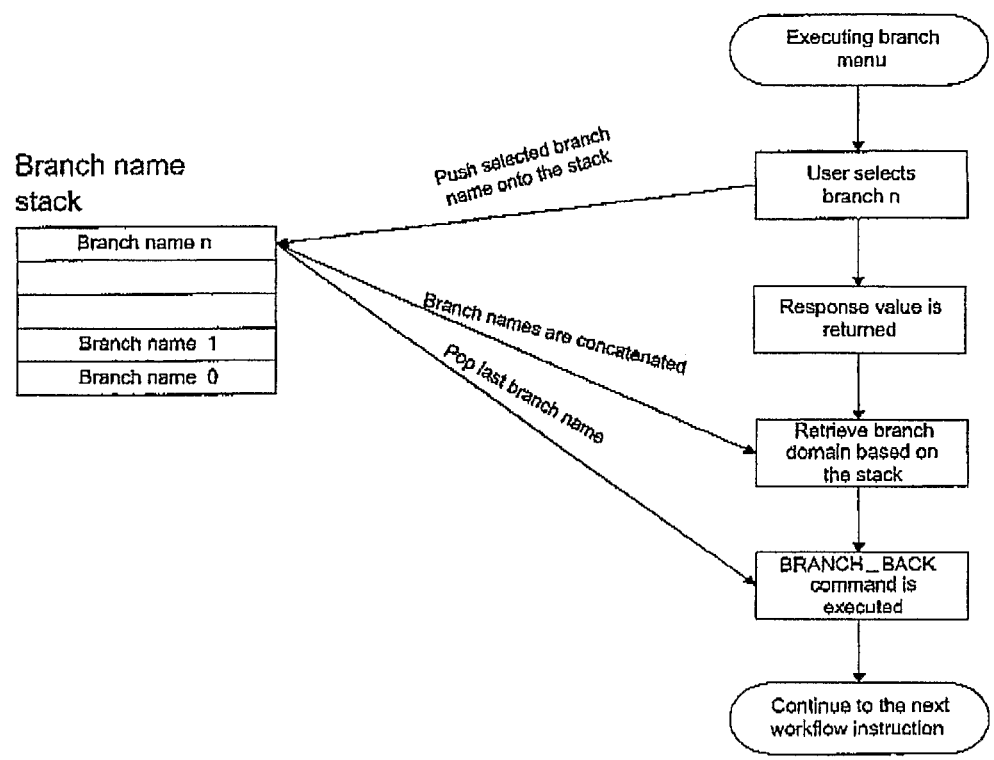
FIG. 26 is a schematic diagram illustrating the use of a branch name stack to determine control flow.

Because an instruction might be involved in different branches through out the workflow, the workflow execution engine 408 differentiates the instruction response data for different branches using branch domains. A branch domain specifies the address of a workflow instruction in the workflow tree. When setting the instruction response data, the response parameter name is prefixed with the corresponding branch domain, separated by a period character. For example, an instruction to retrieve user input for a numeric-valued parameter with the parameter name "number" could be called from two different branch menus: one named "First branch", and the other named "Second branch". In both of these cases, the instruction returns the same parameter name "number" but with different values. The workflow execution engine 408 associates a branch domain with the parameter name to differentiate the two response values. Thus in this example, the first value is returned as "First branch.number=xxx" and the second value as "Second branch.number=yyy", where "xxx" and "yyy" represent the actual values entered by the user. FIG. 25 shows a more complex example where menu selections are nested.

Figure 39:
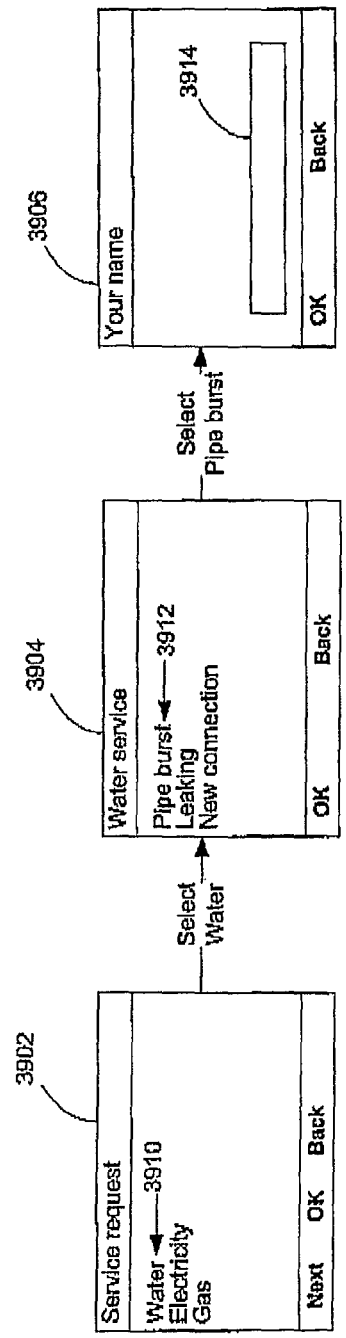
FIG. 39 is a schematic diagram illustrating how the branch names of nested menus are used to label parameter data.

Additionally, the branch domain is appended with a branch name on selection of a branch menu. For example, in an application with two nested branch menus 3902 "Service Request" and 3904 "Water Service" as shown in FIG. 39, when the user selects item 3910 "Water" in menu 3902, and then selects item 3912 "Pipe Burst" in the subsequent branch menu 3904 "Water Service", and then fills out 3914 with "John Doe" in the text input screen 3906 "Your name", the client application 102 will internally send the response as "Water.Pipe burst.name=John Doe". When the BRANCH_BACK command is executed, the previous branch name is removed. The workflow execution engine 408 uses a branch name stack to maintain the order of branch names as they are selected.

Figure 27:
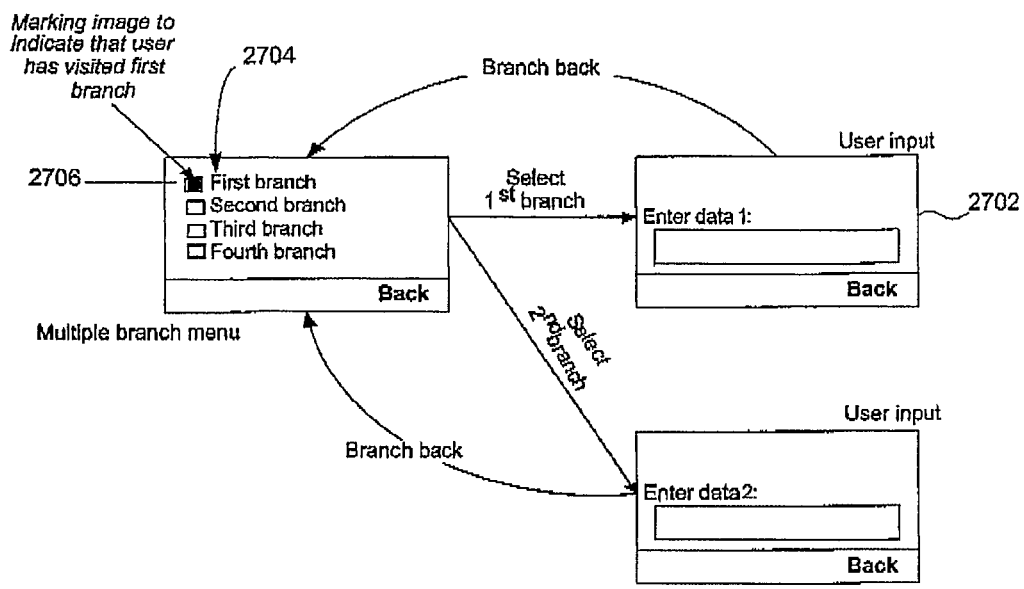
FIG. 27 is a schematic diagram illustrating the user interface components resulting from selecting different branches of an interactive application.

For usability reasons, when working with a multiple branch menu, it is important for the user to know whether or not a branch has already been visited by the user. To this end, the workflow execution engine 40S indicates visited branch menu items by displaying an image adjacent to those branches to indicate that they have already been visited by the user. For example, as shown in FIG. 27.

When the user has visited user input screen 2702 to enter data 1, an image icon 2706 is displayed adjacent to the first branch menu item 2704 is marked with distinct. This allows user to visually distinguish those parts of the workflow that have been visited from those parts that have not been visited. Alternatively, the visited branches could be displayed in a different colour, as used by web browsers to indicate that a hyperlink has been visited.

Backward Navigation

Figure 28:
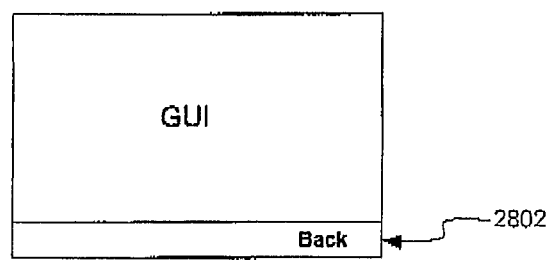
FIG. 28 is a schematic diagram illustrating the inclusion of a 'back' button on each user interface display.
Figure 29:
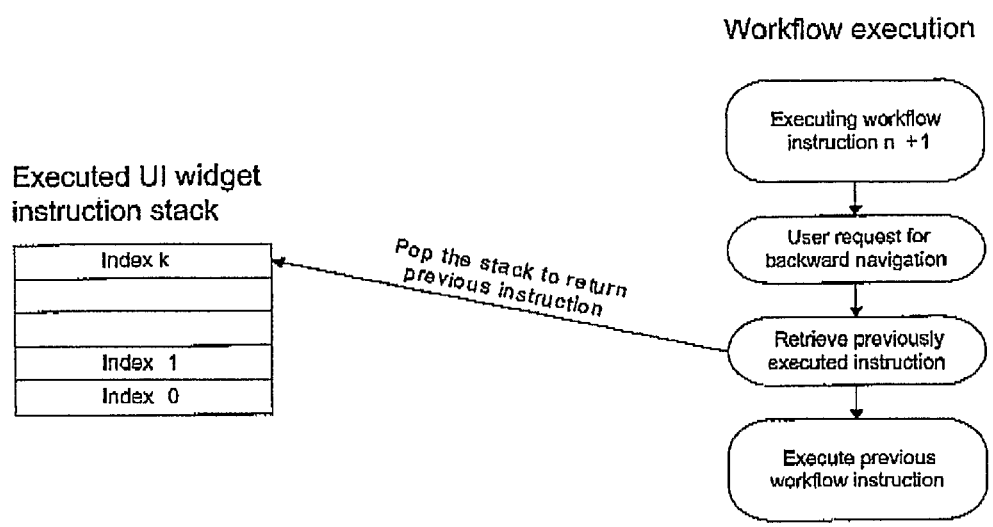
FIG. 29 is a schematic diagram illustrating the use of an executed instruction stack to implement the 'back' button of FIG. 28.

As shown in FIG. 28, all of the user interface screens include a "Back" navigation button 2802 to allow the user to return to the previous screen within the workflow. The position of this back button can change depending on the specific mobile device platform executing the client application 102. As shown in FIG. 29, the workflow execution engine 408 maintains an ordered list or stack of instructions that cause a change in the screen or display, and selection of the "Back" button causes the execution to return to the previous instruction.

Sending a Workflow Description to the Instruction Compiler

As described above, a developer, 116 can send a workflow description to the instruction compiler 602 of the application gateway 104 by submitting programming instructions written in the programming language supported by the instruction compiler 602, using a hypertext transport protocol (HTTP) interface of the instruction compiler 602. For example, FIG. 30 is a screenshot of an HTML webpage generated by the application gateway 104. The webpage includes a scrollable text box 3002 into which the developer 118 can directly enter commands in the scripting language, and a compile button 3004 which, when pressed, submits the text in the scrollable text box 3002 to the instruction compiler 602 for compilation.

The scripting language of the interactive systems is a high level language for describing the workflow of an interactive application. It is similar in vein to BASIC and can be learn quickly by a programmer who has a basic knowledge in programming.

Alternatively, a workflow description can be sent to the instruction compiler 602 by invoking API calls to the application gateway API 616. For example, FIG. 31 shows a source code listing of a J2ME function SendWorkflowRequest that is used to generate and send workflow instructions to the mobile telephone 106. In this example, the workflow instructions are to display booking details to the user 120 and then retrieve the user's response indicating whether the user 120 accepts or rejects the booking, together with the user's name and telephone number. The workflow API is first initialised by creating (at 3102) a new J2ME Command( ) object named WorkflowCommand. A workflow header, as described below, is then added at 3104. Workflow instructions are then added in the order of desired execution by calling APIs that are provided as methods of the WorkflowCommand object. Each type of workflow instruction is added by calling a corresponding API function with a set of parameters. For example, the object method AddInfoMessage is used (at 3106) to add an instruction that displays a screen of information to the user. The first argument to this method provides a title for the screen, and the second argument provides the actual text information that is displayed. Similarly, the method AddSingleMenu adds (at 3108) an instruction that displays a single-level menu (i.e., radio buttons) to the user, allowing the user to select one item from a list of items provided as a parameter to the method. In this example, the two items are displayed as "Accept", and "Reject", and the user's response indicates whether the user 120 accepts or rejects the booking.

The method AddUserInputCmd (at 3110 and 3112) displays a text string to the user, together with a textbox, prompting the user to enter an appropriate input value. The first parameter to this function finds the name of the parameter that will be associated with the returned input value. The second argument provides a string that is displayed to the user, and a third argument allows the developer to restrict the type of input; for example, to a phone number, email address, and so on.

Finally, the AddRedirectHeader method (at 3114) defines a return address or phone number to which the response will be redirected, as described above. The communication channel to be used (e.g., whether by SMS, IP network, Bluetooth, etc) is also specified in the header.

Once the workflow instructions are added, the workflow API is called again (at 3116) to compile the instructions and build the payload data to be sent to the client application. The workflow API is called as many times as needed (at 3118) to send multiple messages if required.

Scripting Language Overview
   Instructions are written line by line.
   Comment lines start with //
   Label lines start with #
   String parameters, are delimited by double quote characters " "

Workflow-programming Structure

Commands are processed sequentially line by line. Three instructions are provided to create tree structures of the workflow: BRANCH_TO, BRANCH_BACK, and GOTO. BRANCH_TO and BRANCH_BACK are used in combination to create a subroutine for the compiled program. GOTO is a jump instruction that allows program execution to jump to a specified line in the script. Comment and blank lines are ignored by the instruction compiler 602.

Command Line Syntax

A command is a line in the script which has the following structure:
   <Command Name> <String Parameter> <String Parameter> <Label>
   Where:
      <Command Name> is a command.
      <String Parameter> is a qualified string value, i.e., delimited by double quote characters. For example, "User name" is a string parameter. There can be more than one string parameter in each command.
      <Label> is the name of the label that is associated with the command. Labels can only be used with the GOTO command and the ITEM command when used in conjunction with BRANCH_TO command.

Comment

There is no block comment in the language, Comment lines are lines that start with // (two forward slash characters followed by a space character).
   Example:
   // this is a comment line Label A label is a way to mark a line number so that it can be referred to in GOTO and BRANCH_TO's ITEM commands. A label line starts with # (hash) character, followed by a space character. The label name is the next word from the # character.
   Example:
   For label START, the line looks like this:
   # START
   The label name is mapped to the index (i.e., relative position in the script) of the command immediately following the label line.
   Labels in a script must be unique, a compile error occurs if a duplicate label is detected. All labels are parsed in the first pass of the compiler, building a mapping of label and command index to be used in the second pass.

Backward Navigation

As described above, a "Back" navigation button is attached to all displayed screens by default. This button allows backward navigation of the workflow executed on the user device 106. On most mobile phone platforms, this "Back" button is mapped to the right action key. However, this can change depending on the type of phone.

Tree Navigation

Figure 32:
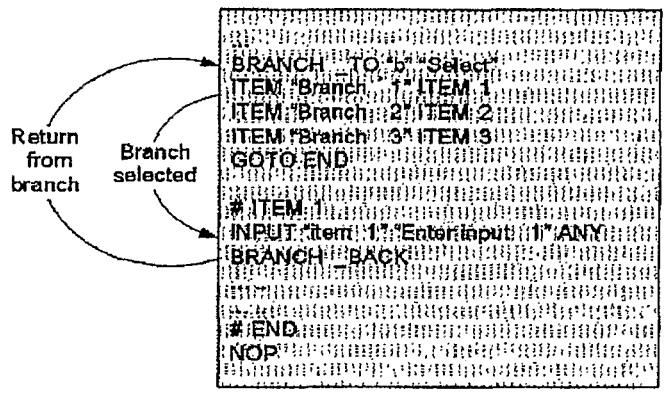
FIG. 32 is a partial listing of a scripting language application, illustrating the use of control flow branches in the scripting language.
Figure 33:
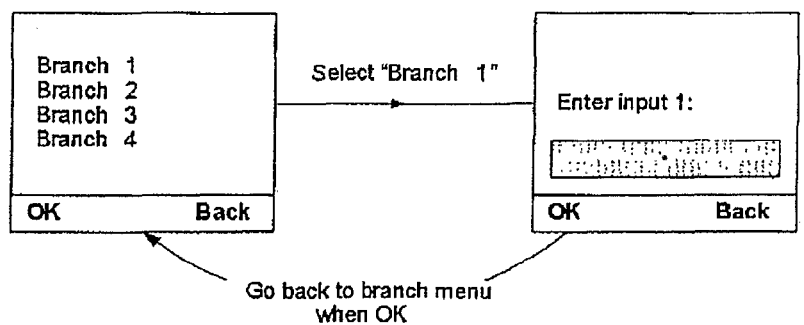
FIG. 33 is a schematic diagram illustrating the user interface components generated from the scripting language example of FIG. 32.

A combination of the BRANCH_TO command, labels, and the BRANCH_BACK command allows the workflow to support a tree like execution structure, as shown in the source code listing of FIG. 32 and the resulting display screens of FIG. 33. A detailed description is provided below. When a user is navigating thought workflow screens, the state of each screen (item selection and user inputs) is not remembered.

Example

Figure 34:
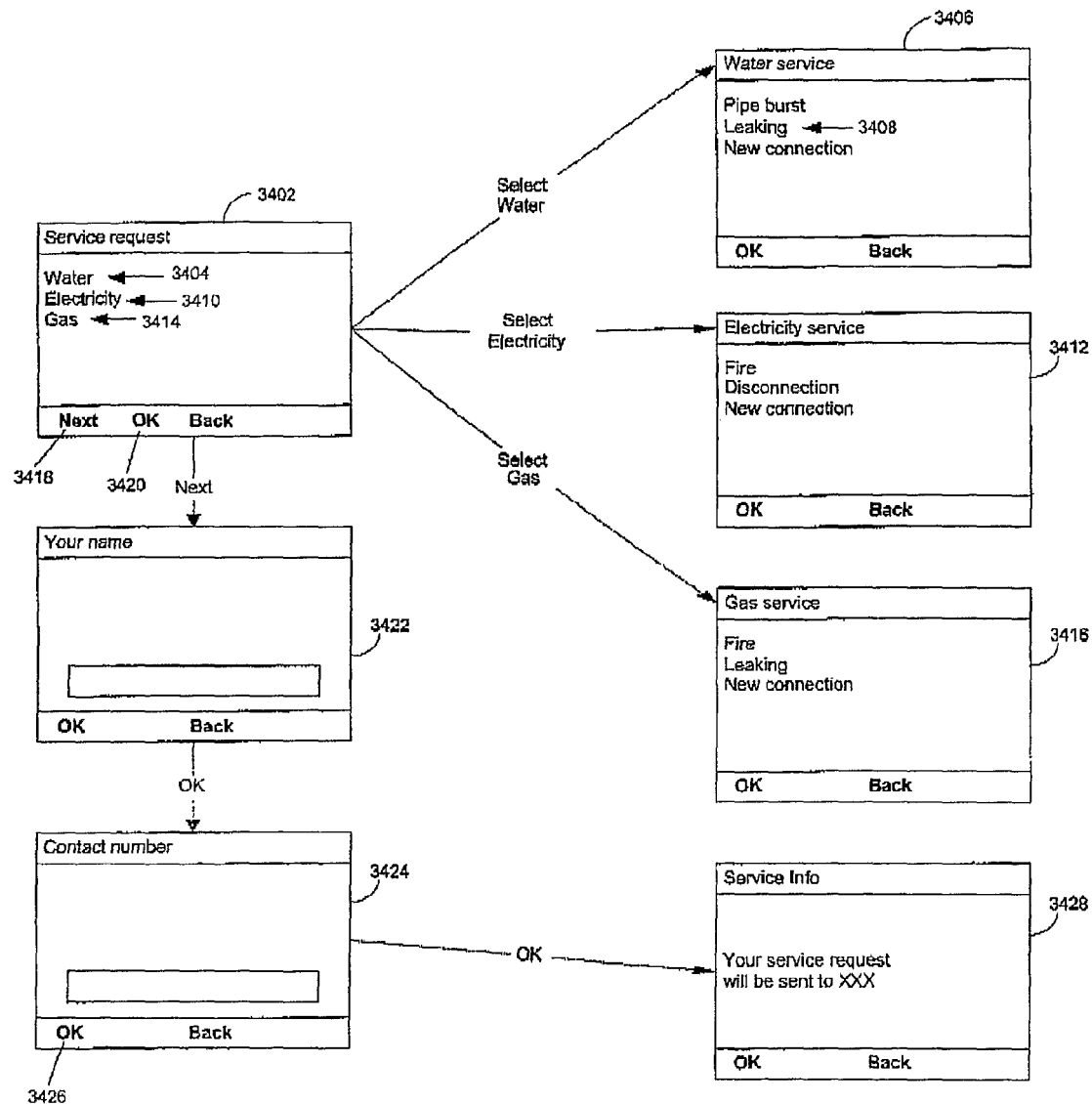
FIG. 34 is a schematic diagram illustrating the use of nested user interface displays generated by the system.

The following is a source code listing that is used to generate an interactive application for execution on a user device such as the mobile telephone 106. The source code defines a workflow that allows the user 120 of the mobile telephone 106 to generate a service request for water, electricity, and/or gas services. The listing is arranged in four groups of commands or paragraphs under respective labels. The first paragraph, labeled START, results in display of a main screen 3402, as shown in FIG. 34. The BRANCH_TO command has two parameters. The first, "serv" defines a branch name for this branch, and the second parameter, "Service Request" defines the title that is displayed at the top of the main screen 3402. The subsequent three commands define items that can be selected by the user to invoke corresponding workflow branches. For example, the first ITEM command has two parameters. The first parameter, "Water", defines the text 3404 that is displayed on the main screen 3402, and that can be selected to invoke the corresponding workflow branch. The second parameter, in this case "WATER", is a label of the corresponding workflow branch, in this case referring to the second group or paragraph of commands grouped under that label. Thus if the user navigates the main screen 3402 to select the first item 3404, the workflow jumps to the SELECT ITEMS, causing display of a water service selection screen 3406. In this case, the three items are simply menu selections (rather than workflow branches), and thus selection of any one of these items causes the appropriate parameter, in this case named "water" to be assigned a value defined with the corresponding item. For example, if the user selects the second item, "Leaking" 3408, then the parameter "water" is assigned the value "Leaking". Once this item has been selected, the workflow proceeds to the following command, which in this case is the BRANCH_BACK command, which returns control to the main screen 3402.

In this manner, the user can select the Electricity item 3410 to branch to the ELECTRICITY workflow, resulting in display of a Electricity service screen 3412. Similarly, the user can select the "Gas" request item 3414 to cause a Gas service screen 3416 to be displayed. Once the user is satisfied with the service requests thus defined, selection of the Next button 3418, or the OK button 3420 causes execution to continue to execute in this example the command "GOTO CONTACTS", which causes the workflow to jump to the command following the CONTACTS label, being in this case an INPUT command displaying a name input screen 3422, and subsequently a Contact number screen 3424. Once the OK button 3426 on the Contact numbers screen 3424 has been selected, a MESSAGE command causes display of a Service Info screen 3428 providing informational feedback to the user, in this case confirming that the service request will or has been sent to an appropriate party for processing the user's request.

```
// Start of program
# START
BRANCH_TO    "serv" "Service Request"
ITEM         "Water" WATER
ITEM         "Electricity" ELECTRICITY
ITEM         "Gas" GAS
GOTO         CONTACTS
# WATER
SELECT       "water" "Water service"
ITEM         "Pipe Burst"
ITEM         "Leaking"
ITEM         "New connection"
BRANCH_BACK
# ELECTRICITY
SELECT       "elect" "Electricity service"
ITEM         "Fire"
ITEM         "New connection"
ITEM         "Disconnection"
BRANCH_BACK
# GAS
SELECT       "gas" "Gas service"
ITEM         "Leaking"
ITEM         "New connection"
ITEM         "Fire"
BRANCH_BACK
// This is like a subroutine
```

```
# CONTACTS
INPUT        "name" "Your Name" ANY
INPUT        "phone" "Contact Number" NUMERIC
// message is sent here
//# END
MESSAGE      "Service Info" "Your request will be sent to XXXX"
```

Script Commands and Syntax

HEADER Command

The HEADER command is used to include a specified piece of text at the beginning of the response message when the workflow has been executed. This command is invisible to the user of the user device. This command is used as a context identifier for server-client conversation.

There can be multiple header commands in the script. When using the HEADER command in conjunction with the BRANCH_TO command, different response message prefixes can be set, based on the user's selection.

Syntax
  HEADER <header>
    <header> is a string parameter to be prepended to the response text message.
Example
  HEADER "timesheet"
Response
  <header> is attached to the beginning of the response message. If there are multiple headers to be included in the response message, the response headers are prepended based on their execution order in the workflow.

DIVERT Command

The DIVERT command is used to redirect a response message to a telephone number or address different from that of the source of the original instructions. Normally, the response message is sent back to the source address of the payload, but the response message can be sent back to another number instead by including a DIVERT command in the workflow. This command is invisible to the user. There can be multiple DIVERT commands in the scripts but the last one that is executed in the workflow takes effect. When combining this command with the BRANCH_TO Command, the workflow can send a response message to a source number selected by the user.

Syntax
  DIVERT <address>
    <address> is a string parameter representing the mobile number of the redirected address.
Example
  DIVERT "+61418366896"

MESSAGE Command

MESSAGE command shows a message with a tide and message content to the user.

Figure 35:
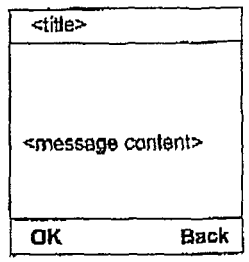
FIGS. 35 and 36 are schematic diagrams illustrating the appearance and structure of general user interface displays generated by the system.

Syntax
  MESSAGE <title> <message content>
    <title> is a string parameter for of the title of the message to be displayed.
    <message content> is a string parameter.
  The end result is display of a screen as shown in FIG. 35.
Example
  MESSAGE "Hello" "Hello world"
Response
  This GUI screen does not collect any user input and no response data is associated with it.

INPUT Command

Figure 36:
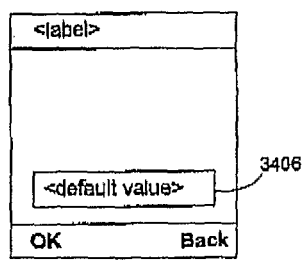

This command displays a GUI screen with a text input box 3602 to the user to retrieve user inputs, as shown in FIG. 36.

A parameter name is provided in the command to set the name of the user input data when included in the response message. A default input value can be provided as an input parameter. If desired, the user input data can be restricted to a certain types such as numeric, decimal or a phone number. However, the implementation of user input restriction depends on the capability of the user device executing the client application 102.

Syntax

INPUT <return parameter> <label> <type> <default value>

<return parameter> is a string parameter for the name of the entered value to be set in the return message.

<label> is the title of the input text box

<type> is the type of the input to be captured, these types are available:

ANY
        EMAILADDR
        NUMERIC
        PHONENUMBER
        URL
        DECIMAL

<default value> is an optional string parameter to be set to the input text box when the screen is visible to the user. If omitted, the default value of the input text box is left empty.

Response

User input data is included in a response message associated with a parameter name specified in the corresponding instruction. If the INPUT command is executed in a branch routine (see BRANCH_TO command) then any domain path applicable will be prefixed to the parameter name.

<return parameter>=<value> (without domain path)
    <domain path> <return parameter>=<value>
    Where:
        <value> is a string value that user enters. This can be an empty value.
        <domain path> is the path of branches that lead to this INPUT command in the workflow.

GAUSS Command

Figure 37:
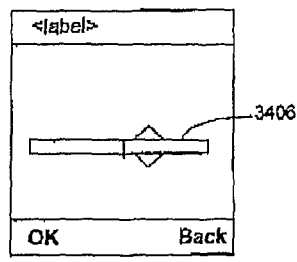
FIG. 37 is a schematic illustration of a slider control display generated by the system.

This command results in the display of an interactive screen having a slider or "gauss" control 3702 to prompt the user to provide corresponding response data, as shown in FIG. 37. The user is able to slide the slider control from a minimum value to a maximum value specified on the command fine. The resulting data is included in the response message associated with the parameter name given.

Syntax

GAUSS <parameter name> <minimum value> <maximum value> <default value>

<parameter name> is a string parameter for the name of the gauss value to be set in the return message.

<minimum value> is the minimum value the user can select.

<maximum value> is the maximum value the user can select

<default value> is the default value if the user does not select any value. This parameter is optional so if it is not present, the default value is empty.

Example

GAUSS "temper" "1" "10" "5"

Response

If this command is executed in a branch routine (see BRANCH_TO command) then any domain path applicable will be prefixed to the parameter name.

<parameter name>=<value> (without domain path)
    <domain path> <parameter name>=<value>

GOTO Command

This command allows the workflow execution engine 406 to jump to a specific workflow instruction, rather than proceed to the next instruction in sequence. A parameter of this command is the label of the instruction for the workflow execution to be directed to. There is no user screen or response data associated with this instruction.

Syntax

GOTO <label>

<label> is the label name indicating the index the command that the workflow execution jumps to after executing this command.

Example

```
....
GOTO Hello // The program jumps to message hello world after executing this command.
...
...
# Hello
MESSAGE "Hello" "Hello world"
...
```

SELECT, SELECT_MULTI Command

Figure 38:
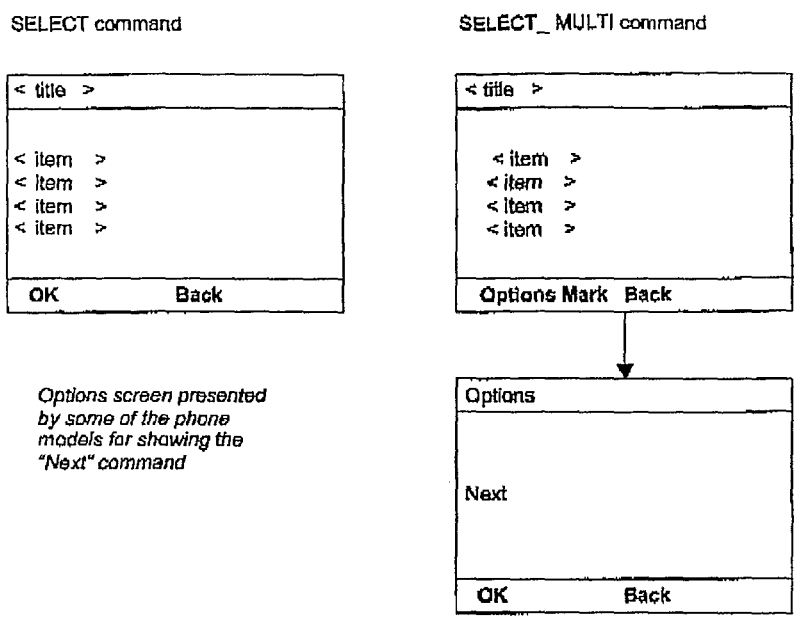
FIG. 38 is a schematic diagram illustrating the use of single and multiple selections in user interface displays generated by the system.

As shown in FIG. 38, these commands display a screen with a list of items to select from. The SELECT command allows single item selection, and the SELECT_MULTI command allows multiple item selection screen. The user selection is included in the response message identified by the parameter name. In case of multiple selection list, the selected values are separated by a delimiter character in the response value data.

Syntax

SELECT or SELECT_MULTI command is followed by ITEM definitions (one per line).

```
SELECT              <parameter name> <title>
ITEM                <item name>
ITEM                <item name>
ITEM                <item name>
SELECT_MULTI< parameter name> <title>
ITEM                <item name>
ITEM                <item name>
ITEM                <item name>
```

Where:

<parameter name> is a string parameter specifying the return parameter id for the SELECT screen.

<title> is a string parameter specifying the title of the screen.

<item name> is a string parameter specifying the item to be displayed on the screen.

Example

```
// This example allows the mobile user to select one of the option listed
SELECT "tsk" "Select task"
ITEM "Administration"
ITEM "Service desk"
ITEM "Client meeting"
// This example allows mobile user to select one or many of user names in the list
SELECT_MULTI "name" "Select users"
ITEM "User 1"
ITEM "User 2"
ITEM "User 3"
```

Far multiple select command, each of the items in the select list is displayed adjacent to an icon that indicates whether or not the item has been selected by the user. On most mobile devices, a "Mark" button is displayed to allow user to mark the selection of the highlighted item. A "Next" button is also attached to this screen to allow the user to navigate to the next workflow instruction. On some mobile device platforms, the Next button is mapped directly to one of the mobile phone buttons.

Response

```
SELECT command:
    <parameter name>=<item>
SELECT_MULTI command:
    < parameter name >=<item>;<item>;<item>
```

Where:

<item> is the item name as selected

The multiple select response can be empty.

BRANCH_TO Command

This command provides users a list of items to select, and on selection of an item, execution of the workflow is branched to the specified command. The behavior of this screen is similar to the SELECT screen described above. Once the workflow execution starts executing from the new target instruction, it follows the default sequential order. When the BRANCH_BACK command is executed, the workflow execution engine returns to the previous BRANCH_TO command to execute. However, the BRANCH_TO command does not require a BRANCH_BACK command to operate. The workflow can consequently branch to the last command without returning to the branch menu.

To progress to the next screen from a BRANCH_TO command, a "Next" button is provided. On some phones, this button is mapped to one of the phone keys on the mobile device. On most phones however, this button is mapped to a soft-key named "Next" when the user select Options on the BRANCH_TO screen (similar to SELECT_MULTI command).

There is no specific user value attached to this screen in the response message. The selected branch item is however appended to the branch domain path. This domain path is then appended to the parameter name of any input screens being executed in the branch target.

Syntax

BRANCH_TO command is followed by ITEM definitions (one per line).

```
BRANCH_TO    <parameter name> <title>
ITEM         <item> <label>
ITEM         <item> <label>
ITEM         <item> <label>
```

Where:

<parameter name> is a string parameter specifying the return parameter id for the BRANCH_TO screen.

<title> is a string parameter specifying the title of the screen.

<item > is a string parameter specifying the item to be displayed on the screen.

<label> is a valid label name as specified in the workflow with "#" character.

Examples

```
...
# EnterBetAmount
INPUT "bet" "Enter bet amount" DECIMAL
BRANCH_BACK
....
# SelectBetAmount
SELECT "bet" "Select bet amount in dollars"
ITEM "100"
ITEM "200"
ITEM "300"
BRANCH_BACK
....
BRANCH_TO "b" "Select team to bet"
ITEM "Melbourne" EnterBetAmount
ITEM "Geelong" SelectBetAmount
GOTO END
...
# END
MESSAGE "Info" "Please select Yes to allow response message
    to be sent"
```

Response

The domain path is appended with <item> selected in the branch menu.

This domain path is then appended to the parameter name of any input screen executed in the branch target. In the example script, the "bet" amount parameter name when appearing in the response message is: Melbourne.bet=<bet value>.

BRANCH_BACK Command

This command is invisible to the user, it provides the capability to navigate back from branching. A workflow could have multiple branches wired up and the result is a tree like structure. BRANCH_BACK command allows navigation upwards in this tree structure. Combination of label and BRANCH_BACK command allows combining a group of workflow commands in to a routine, which can be referred to multiple times during the workflow execution.

Syntax

BRANCH_BACK

STORE_PERMANENT Command

This command instructs the workflow execution to store the whole payload data to persistent storage. A title is set in the parameter of this command allows the client application to display the stored payload data to the user. This command does not result in any user data in the response message.

Syntax

STORE_PERMANENT <title>

Where:

<title> is a string parameter indicating the title of workflow payload data to be displayed in the persistent list. This persistent list is displayed to the user when the client application is started manually by the user and no instant payload data is waiting to be executed.

Example

STORE_PERMANENT "Message one"

CLEAR_PERMANENT Command

This command clears all the persistent workflow payload data previously saved by STORE_PERMANENT command. Execution of this command does not result in any data in the response message.

Syntax

CLEAR_PERMANENT

EXECUTE Command

This command makes a request to the mobile device operating system to retrieve an URL address. The results could be making a phone call or launching the internet browser on the phone to the specified URL address. Behavior of this command might varies across different device models due to device capabilities.
Syntax
   EXECUTE <url_address>
   Where:
      <url_address> is a string parameter describing the URL address of the request to be sent to the J2ME platform.
Example
   To make a mobile phone call to +61418366896 mobile number
      EXECUTE "tel:+61418366896"
   To launch the internet browser on the mobile phone to access ACME mobile website EXECUTE "http://mobile.acme.com"
Response
   If making a mobile phone call is required, the mobile device will ask user if a mobile phone call can be made. If launching of the internet browser is required, the application will ask for the user's permission to open the internet connection to the specified URL.
CONFIGURATION Command
   The response message is constructed from the user/system data. A number of default delimiter characters are used to separate the data parts as well as name-value separator. This command when included in the payload data can change the delimiter characters of the response message as well as specifying whether or not the name part is included in the response message.
Syntax
   CONFIGURATION <configuration_string>
   Where <configuration_string> is composed of configuration characters:
      $1^{st}$ character: Include parameter in the response, if set to '0', the response message only has values, set to '1', the response message has Name=Value
      $2^{nd}$ character: Response part delimiter, the default is ','
      $3^{rd}$ character: Equal character, the default is '='
      $4^{th}$ character: Multiple selection options, the default is ';'
      $5^{th}$ character: Screen path delimiter, the default is '.'
Example
   CONFIGURATION "0,=;."
   This configuration command instructs the workflow execution to exclude parameter names from the response message.
SYSTEM_PROPERTY Command
   This command instructs the workflow execution to read a system property and return the result in the response. The parameter name that is associated with the response data is the system property if parameter name is omitted.
Syntax
   SYSTEM_PROPERTY <property_name> <parameter name>
   Where:
      <property_name> is the system property to be read. On the J2ME platform, examples of these properties are:
         microedition.profiles
         microedition.configuration
      <parameter name> is an optional string parameter. If omitted, property name is used as parameter name in the response instead.
Examples

---

SYSTEM_PROPERTY "microedition.profiles"
SYSTEM_PROPERTY "microedition.profiles" "midp"

---

Response
   The value of the system property is included in the response message as name=value pair. All the rules applied to the name-value pairs are applied. These include changing of delimiter parameters and whether or not to include the name part in the response message.
      <system property>=<value> (if parameter name is omitted)
      <parameter name>=<value> (if parameter name is present)
NOP Command
   This is a no-operation command. It is useful when used in conjunction with labeling.
Syntax
   NOP
SET_KEYS Command
   A command to set the encryption key specified by the index of the key on the mobile device.
Syntax
   SET_KEYS <key_index> <key>
   Where <key_index> is a string parameter indicating the index of the key to be set on the client application 102. <key> is a string parameter containing the actual key to be updated.

Many modifications will be apparent to those skilled in the art without departing from the scope of the present invention as hereinbefore described with reference to the accompanying drawings.

It will be apparent from the description above that the interactive system and process described herein allow a developer to dynamically send on demand customisable workflow instructions to one or more user devices 106 such as mobile telephones. The generation, secure delivery, execution, and secure return of response data to the developer are all handled transparently by the interactive system, thus hiding all the details of these aspects from the developer, greatly simplifying the provision of interactive applications and quasi-real-time interactions with one or more users. The provision of workflow instructions via SMS is particularly advantageous as it can be assumed to be supported by all mobile telephones available today. Moreover, since the SMS communications are all managed by the interactive system, any premium SMS services that may be required can be established by the operator of the interactive system, thus freeing the developer from needing to establish their own independent premium SMS services. This greatly simplifies the provision of new interactive applications, and also allows the operator of the interactive system to provide these services at a lower cost by leveraging the substantial volume of SMS traffic resulting from the aggregation of SMS traffic or all developers using the interactive system.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:
1. A method of delivering an instruction to a mobile device coupled to a network, the method comprising the steps of:
   receiving an application for execution on the mobile device;
   translating the application into the instruction in a form executable by the mobile device, an address of the instruction being associated with a branch domain of a workflow tree; and
   sending a message including the instruction to the mobile device, the instruction configured for verification by the mobile device and the instruction including an address of a gateway server, information associated with processing data to the gateway server, and communication information to exchange the data with the gateway server;
wherein the step of sending the message includes the step of sending a set of instructions for execution on the mobile device, the instructions including one or more addresses for the mobile device, one or more responses to be received from the mobile device, a server address to send the one or more responses, and how the one or more responses should be processed by the server, wherein the set of instructions are configured to include a divert command to divert one or more responses to a second backend system and wherein the step of sending the message includes the step of checking the integrity of the response by calling an Application Program Interface (API) of a first backend system when the one or responses are diverted to the second backend system.

2. A method as defined by claim 1 further comprising dynamically providing a plurality of messaging APIs by dynamically loading compiled code that implements one or more messaging interfaces and wherein the step of receiving the application includes the step of receiving the application coded in a high level programming or scripting language.

3. A method as defined by claim 1 wherein the step of receiving the application includes the step of receiving the application from an external or third party.

4. A method as defined by claim 1 wherein the step of sending the message includes the step of sending a set of instructions for the device to interact with a user of the mobile device.

5. A method as defined by claim 1 further comprising the step of the mobile device receiving the set of instructions and the unique message identifier.

6. A method as defined by claim 5 wherein the step of the mobile device receiving the set of instructions and the unique message identifier includes the step of receiving the set of instructions for translation to mobile device system codes by a workflow execution engine component of the application.

7. A method as defined by claim 5 further comprising the step of receiving a response to the instruction from the mobile device.

8. A method as defined by claim 7 wherein the step of receiving a response includes the step of receiving a response identifier from the device.

9. A method as defined by claim 8 wherein the method comprises the step of comparing the unique message identifier and the response identifier to confirm the authenticity of the received message.

10. A method as defined by claim 1 wherein the step of translating the instruction includes tailoring the instruction to a device operating system.

11. A method as defined by claim 1 wherein the mobile device is one of a plurality of mobile devices and the method also comprises the step of receiving a specification of the mobile device from a database comprising respective specifications for the plurality of devices.

12. A method as defined by claim 11 wherein the step of translating the application includes tailoring the instruction to the specification.

13. A method as defined by claim 1 wherein the step of sending the message includes one or more preliminary steps of compressing, encoding and encrypting the instruction.

14. A method as defined by claim 1 wherein the step of sending the message includes the step of sending the message via a Short Message Service (SMS) over a cellular network.

15. A method as defined by claim 14 wherein the step of sending the message via SMS includes the step of splitting the message into a plurality of messages to comply with one or more standards of the SMS.

16. A method as defined by claim 1 wherein the step of sending the message includes one or more of the steps of sending the message via a Cell Broadcast Service (CBS) of a cellular network, sending the message as an IP/TCP data packet over a GPRS or 3G network, and sending the message as a data packet over a Bluetooth connection.

17. A method as defined by claim 1 wherein the step of sending a message includes receiving a set of instructions identified by a unique label and stored in a permanent data store, wherein the set of instructions are configured to be persistent on the mobile device.

18. A mobile device, comprising:
a processor configured to receive a message including an instruction executable by the mobile device, the instruction being a translation of an application for execution on the mobile device, and the instruction configured to be verified by the mobile device and the instruction including an address of a gateway server, information associated with processing data to the gateway server, and communication information to exchange the data with the gateway server, and an address of the instruction being associated with a branch domain of a workflow tree, wherein the message includes a set of instructions for execution by the mobile device, the instructions including one or more addresses for the mobile device, one or more responses to be received from the mobile device, a server address to send the one or more responses, and how the one or more responses should be processed by the server wherein the set of instructions are configured to include a divert command to divert one or more responses to a second backend system and wherein the step of sending the message includes the step of checking the integrity of the response by calling an Application Program Interface (API) of a first backend system when the one or responses are diverted to the second backend system.

19. A mobile device as defined by claim 18 wherein the application is coded in a high level programming or scripting language and the processor further configured to communicate with a plurality of dynamically provided messaging APIs that are dynamically loaded from compiled code that implements one or more messaging interfaces.

20. A mobile device as defined by claim 18 wherein the application is from an external or third party.

21. A mobile device as defined by claim 18 wherein the set of instructions includes instructions that cause a user to interact with the mobile device.

22. A mobile device as defined by claim 21 wherein the message includes a unique message identifier.

23. A mobile device as defined by 18, wherein the mobile device is a handset.

24. A mobile device as defined by claim 18 wherein the instruction is tailored for an operating system of the mobile device.

25. A mobile device as defined by claim 18 wherein the message is received via a Short Message Service (SMS) over a cellular network.

26. A mobile device as defined by claim 18 wherein the message is received via anyone or more of a Cell Broadcast Service (CBS) of a cellular network, an IP/TCP data packet over a GPRS or 3G network and a data packet over a Bluetooth connection.

27. A non-transitory computer-readable medium containing program code embodying an application program for performing a method of delivering an instruction to a mobile device coupled to a network, the method comprising the steps of:

receiving an application for execution on the mobile device;

translating the application into the instruction in a form executable by the mobile device, an address of the instruction being associated with a branch domain of a workflow tree; and sending a message including the instruction to the mobile device, the instruction configured for verification by the mobile device and the instruction including an address of a gateway server, information associated with processing data to the gateway server, and communication information to exchange the data with the gateway server;

wherein the step of sending the message includes the step of sending a set of instructions for execution on the mobile device, the instructions including one or more addresses for the mobile device, one or more responses to be received from the mobile device, a server address to send the one or more responses, and how the one or more responses should be processed by the server, wherein the set of instructions are configured to include a divert command to divert one or more responses to a second backend system and wherein the step of sending the message includes the step of checking the integrity of the response by calling an Application Program Interface (API) of a first backend system when the one or responses are diverted to the second backend system.

28. The method of claim 27 wherein the message is received via anyone or more of a Cell Broadcast Service (CBS) of a cellular network, an IP/TCP data packet over a GPRS or 3G network and a data packet over a Bluetooth connection.

29. The method of claim 27 wherein the application is coded in a high level programming or scripting language.

* * * * *